(12) United States Patent
Ersoy

(10) Patent No.: US 6,917,736 B1
(45) Date of Patent: Jul. 12, 2005

(54) METHOD OF INCREASING NUMBER OF ALLOWABLE CHANNELS IN DENSE WAVELENGTH DIVISION MULTIPLEXING

(75) Inventor: Okan K. Ersoy, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 87 days.

(21) Appl. No.: 10/431,957

(22) Filed: May 8, 2003

Related U.S. Application Data

(60) Provisional application No. 60/379,280, filed on May 9, 2002.

(51) Int. Cl.$^7$ .............................. G02B 6/34; H04J 14/02
(52) U.S. Cl. ................................ 385/37; 385/1; 385/2; 385/3; 385/24; 385/14; 398/82; 398/83; 398/87
(58) Field of Search .............................. 385/1, 2, 3, 14, 385/39, 40, 37, 15, 146; 398/82, 83, 84, 85

(56) References Cited

U.S. PATENT DOCUMENTS

| | | | |
|---|---|---|---|
| 4,109,996 A | 8/1978 | Ersoy | 350/3.66 |
| 4,279,462 A | 7/1981 | Ersoy | 350/3.6 |
| 4,293,183 A | 10/1981 | Ersoy | 350/3.77 |
| 5,943,159 A | 8/1999 | Zhu | 359/316 |
| 5,999,320 A | 12/1999 | Shirasaki | 359/577 |
| 6,137,927 A | 10/2000 | Keck et al. | 385/24 |
| 6,317,536 B1 | 11/2001 | Bhagavatula et al. | 385/24 |
| 6,674,929 B2 * | 1/2004 | Feng et al. | 385/15 |
| 6,714,704 B2 * | 3/2004 | Lin et al. | 385/37 |
| 2003/0095737 A1 * | 5/2003 | Welch et al. | 385/14 |
| 2003/0128917 A1 * | 7/2003 | Turpin et al. | 385/24 |
| 2004/0037500 A1 * | 2/2004 | Yoo | 385/31 |
| 2004/0062512 A1 * | 4/2004 | Pawlowski et al. | 385/141 |

OTHER PUBLICATIONS

H.Takahashi, S. Suzuki, K. Kato, and I. Nishi, "Arrayed–Waveguide Grating for Wavelength Division Multi/Demultiplexer with Nanometre Resolution,"*Electron. Lett.,* vol. 2, 26., No. Jan. 1990, pp. 87–88.

C. Dragone, "An N x N Optical Multiplexer Using a Planar Arrangement of Two Star Couplers."*IEEE Photon. Technol. Lett.,* vol. 3, Sep. 1991, pp. 812–814.

Okan K. Ersoy, "One–Image–Only Digital Holography,"*Optik,* vol. 53, pp. 47–62, Apr. 1979.

O.K. Ersoy, "Construction of Point Images with the Scanning Electron Microscope: A Simple Algorithm,"*Optik,* vol. 46, Sep. 1976, pp. 61–66.

Eli Brookner, "Phased–Array Radars,"*Scientific American,* Feb. 1985, pp. 94–102.

(Continued)

*Primary Examiner*—Brian M. Healy
(74) *Attorney, Agent, or Firm*—William F. Bahret

(57) ABSTRACT

A phased-array device for wavelength division multiplexing/demultiplexing, comprising at least one input channel, a plurality of output channels, and an irregularly sampled array of phase modulators between the input and output channels, the irregular array having a configuration and phase modulation such that effectively only one beam at a given wavelength is focused onto a given output channel. In one embodiment the individual phase modulators are randomly spaced, their relative locations being determined by establishing a set of initially chosen locations, shifting each initial location by a random increment resulting in delay within one wavelength if the initially chosen locations are not sufficiently random, and then adjusting each shifted location a fraction of a wavelength such that the overall phase shift to a desired image point on one of the output channels equals a constant value.

10 Claims, 24 Drawing Sheets

OTHER PUBLICATIONS

Tom Y. Zhu, "Irregular Virtual Optical Phased–Array," in Ivan Cindrich, Sing H. Lee, Richard L. Sutherland (ed.), *Diffractive/Holographic Technologies and Spatial Light Modulators VII*, Proceedings of SPIE, vol. 3951, 2000, pp. 61–72.

Katsunari Okamoto, "Recent Progress of Integrated Optics Planar Lightwave Circuits," Kluwer Academic Publishers, Netherlands, 1999, pp. 107–129.

R. Adar et al., "Broad–Band Array Multiplexers Made With Silica Waveguides on Silicon," *Journal of Lightwave Technology*, vol. 11, No. 2, Feb. 1993, pp. 212–218.

Hiroshi Takahashi et al., Transmission Characteristics of Arrayed Waveguide N x N Wavelength Multiplexer, *Journal of Lightwave Technology*, vol. 13, No. 3, Mar. 1995, pp. 447–455.

Meint K. Smit et al., "PHASAR–Based WDM–Devices: Principles, Design and Applications," *IEEE Journal of Selected Topics in Quantum Electronics*, vol. 2, No. 2, Jun. 1996, pp. 236–250.

Mark Volanthen et al., "Characterisation of Arrayed Waveguide Gratings," Kymata Ltd., Mar. 2001.

* cited by examiner

METHOD OF INCREASING NUMBER OF ALLOWABLE CHANNELS IN DENSE WAVELENGTH DIVISION MULTIPLEXING

This application claims benefit of 60/379,280 filed May 9, 2002.

BACKGROUND OF THE INVENTION

This invention relates to communication systems, and more particularly to methods of increasing capacity in dense wavelength division multiplexing (DWDM) systems.

Technological interest in dense wavelength division multiplexing systems is fast increasing. DWDM provides a new direction for solving capacity and flexibility problems in optical communications and networking. It offers a very large transmission capacity and new novel network architectures, as described, for example, in the following papers: C. A. Brackett, "Dense Wavelength Division Multiplexing Networks: Principles and Applications." *IEEE J Select. Areas Commun.*, vol. 8, pp. 948–964. 1990; and C. A. Brackett, A. S. Acampora, I. Sweitzer. G. Tangonan. M. T. Smith, W. Lennon. K. C. Wang, and R. H. Hobbs. "A Scalable Multiwavelength Multihop Optical Network: A Proposal for Research on All-Optical Networks." *J. Lightwave Technol.*, vol. II. pp. 736–753, May/June 1993. Major components in DWDM systems are the wavelength multiplexers and demultiplexers. Commercially available components are based on fiber-optic or micro-optic techniques. See, e.g., E. C. M. Pennings, M. K. Smit, and G. D. Khoe, 'Micro-Optic versus Waveguide Devices—An Overview,' invited paper, in *Proc. Fifth Micm. Opdcs. Conf* 1995, Hiroshima. Japan. Oct. 18–20. 1995, pp. 248–255; and E. C. M. Pennings, M. K. Smit. A. A. M. Staring, and G.-D. Khoe. "Integrated-Optics versus Micro-Optics—A Comparison." *Integrated Photonics Research IPR '96. Boston. MA. Tech. Dig.* vol. 6. Apr. 29–May 2, 1996. pp. 460–463.

Research on integrated-optic (de)multiplexers has increasingly been focused on grating-based and phased-array (PHASAR) based devices (also called arrayed waveguide gratings. See, e.g., J. P. Laude, Wavelength Division Multiplexing, Prentice Hall, N.Y., 1993; and M. K. Smit, "New Focusing and Dispersive Planar Component based on an Optical Phased Array." Electron. Lett., vol. 24, no. 7, pp. 385–386, March 1988. Both types of devices are imaging devices, i.e., they image the field of an input waveguide onto an array of output waveguides in a dispersive way. In grating-based devices a vertically etched reflection grating provides the focusing and dispersive properties required for demultiplexing. In phased-array based devices these properties are provided by an array of waveguides, the length of which has been chosen such as to obtain the required imaging and dispersive properties. As phased-array based devices are realized in conventional waveguide technology and do not require the vertical etching step needed in grating-based devices, they appear to be more robust and fabrication tolerant. The first devices operating at short wavelengths were reported by Vellekoop and Smit, e.g., in the above-referenced paper by Smit and in the following papers: B. Verbeek and M. K. Smit, "Phased Array Based WDM devices" in Proc. Eur. Conf. on Optical Communication (ECOC'95), Brussels. Belgium. Sep. 17–21, 1995, pp. 195–202; and A. R. Vellekoop and M. K. Smit, "Low-Loss Planar Optical Polarization Splitter with small dimensions," *Electron. Lett.* ~Vol. 25. pp. 946–947, 1989. Takahashi et al. reported the first devices operating in the long wavelength window. See H. Takahashi. S. Suzuki. K. Kaco. and I. Nishi, "Arrayed-Waveguide Grating for Wavelength Division Mult/Demultiplexer with Nanometer Resolution," *Electron. Lett.*, Vol. 26., no. 2, pp. 87–88, Jan. 1990. Dragone extended the phased-array concept from 1×N to N×N devices, as reported in C. Dragone. "An N×N Optical Multiplexer Using a Planar Arrangement of Two Star Couplers." IEEE *Photon. Technol. Lett.* vol. 3. pp. 812–815, September 1991. This paper and all of the literature referenced above or elsewhere in this application are hereby incorporated by reference into the application.

Array Waveguide Grating (AWG) based multiplexers and demultiplexers are essentially the same. Depending on the direction of light wave propagation, the device can be used as either a multiplexer or a demultiplexer. For the sake of simplicity, the demultiplexer operation is illustrated here.

The AWG consists of two arrays of input/output waveguides, two focusing slab regions and the array grating waveguides. This is illustrated in FIG. 1. A single fiber containing the multi-wavelength input is connected to the array of input waveguides. The input multi-wavelength signal is evenly split among the input waveguides and the signal propagates through the input waveguide to reach the input focusing slab region. The light wave travels through the focusing slab and forms an interference pattern at the output end of the input-focusing slab. The light wave is then coupled into the array grating waveguides. Due to the path length difference of each array grating waveguide, a linear phase shift occurs in the light wave traveling through the array grating waveguide. The light wave is subsequently coupled into the output focusing slab. At the output end of the output focusing slab, the multi-wavelength input signal is split into different beams according to their wavelength.

To illustrate the wavelength demultiplexing mechanism, we first examine the path lengths and path difference between the array grating waveguides. The length of the array waveguides and the path length difference $\Delta L$ between two adjacent waveguides are chosen in such a way that the phase retardation for the light wave of the center wavelength passing through every array waveguide is 2 nm. So the phase front of the lightwave at the input end of the array waveguide is reproduced at the output end for the center wavelength, also assuming all the array waveguides are de-coupled. As the light beams propagate through the slab region, the constructive interference forms on the output side of the output-focusing slab. If only the center wavelength is applied, the constructive interference pattern turns out to be a single focused spot at the output side of the output-focusing slab. As the light waves of wavelengths other than center wavelength are passing through the array waveguides, their phase retardation is different from the center wavelength. In fact the phase retardation is linearly proportional to the difference in wavelength with respect to the center wavelength. That induces a linear phase difference in components of different wavelengths within the multiple wavelength input. Such linear phase difference results in a tilting effect for the wavefront as the light wave goes through the array grating waveguides and reaches the input side of the output-focusing slab. A unique phase front is created for each wavelength. As a result, each wavelength would be focused to different positions on the output side of the output focusing slab region. Then, each wavelength is coupled through the output waveguide. This completes the wavelength demultiplexing operation.

The following is an approximate analysis of the focusing and dispersion properties of the demultiplexing operation. In the input focusing slab region, the spacing between the end of adjacent waveguides on the input side is $D_1$, the separation on the output side is $d_1$, distance measured from the center of the input side is $x_1$. The radius of the output curvature is $f_1$. In the output focusing slab region, the spacing between the ends of adjacent waveguides connected to the array waveguide is d. The spacing between the ends of adjacent waveguides connected to the output waveguide is D. The radius of the output curvature is f. As mentioned earlier, the path differences between two adjacent waveguides is $\Delta L$, and the phase retardation is $2m\pi$ with respect to the center wavelength.

Since the processes in the two focusing slab regions are mirror images of each other, it is sufficient to consider the output focusing slab region. We focus upon the light beams passing through the ith and (i−1)th array waveguide. In order for the two light beams to interfere constructively, their phase difference should be multiples of $2\pi$ as they reach the output side of the focusing slab region. The condition for constructive interference is given by $$\beta_s(\lambda_0)\left(f_1 - \frac{d_1 x_1}{2f_1}\right) + \beta_c(\lambda_0)[L_C + (i-1)\Delta L] + \beta_s(\lambda_0)\left(f + \frac{dx}{2f}\right) = \quad (1)$$
$$\beta_s(\lambda_0)\left(f_1 + \frac{d_1 x_1}{2f_1}\right) + \beta_c(\lambda_0)[L_c + i\Delta L] + \beta_s(\lambda_0)\left(f - \frac{dx}{2f}\right) - 2\pi m$$

where $\beta_s$ and $\beta_c$ denote the propagation constants in slab region and array waveguide, m is an integer, $\lambda_0$ is the center wavelength of the multiple wavelength input, and $L_c$ is the minimum array waveguide length. Subtracting common terms from Equation (1), we obtain $$\beta_s(\lambda_0)\frac{d_1 x_1}{f_1} + \beta_c(\lambda_0)\Delta L - \beta_s(\lambda_0)\frac{dx}{f} = 2\pi m \quad (2)$$

When the condition $$\beta_S(\lambda_0)\Delta L = 2\pi m \quad (3)$$

or $$\lambda_0 = \frac{n_c \Delta L}{m} \quad (4)$$

is satisfied for $\lambda_0$, the light input position x, and the output position $x_1$ should satisfy the condition $$\frac{d_1 x_1}{f_1} = \frac{dx}{f} \quad (5)$$

The spatial separation of the mth and (m+1)th focused beams for the same wavelength is called the free spectral range (FSR). It is obtained from Eq.(2) as $$X_{FSR} = \frac{\lambda_0 f}{n_s d} \quad (6)$$

Number of available wavelength channels $N_{ch}$ is given by $$N_{ch} = \frac{X_{FSR}}{D} = \frac{\lambda_0 f}{n_s dD} \quad (7)$$

The resolution of the system is also obtained from Eq.(2) as $$\frac{\Delta x}{\Delta \lambda} = \frac{N_c f \Delta L}{n_s d \lambda_0} \quad (8)$$

Where $N_c$ is the group index of the effective index $n_c$, i.e. $N_c = n_c - \lambda dn_c/d\lambda$.
Setting $\Delta x$ equal to D, we can get $$\Delta L = \frac{n_s dD\lambda_0}{N_c f \Delta \lambda} \quad (9)$$

Two examples of the results obtained with phasar simulation at a center wavelength of 1.550 micrometers, and channel spacing of 0.8 micrometers are given in FIGS. 2 and 3 to illustrate how the number of channels are limited. In FIG. 2, there are only 16 channels, and the second order channels on either side of the central channels do not overlap with the central channels, and hence the design works fine. On the other hand, in FIG. 3, there are 64 channels, and the second order channels on either side of the central channels start overlapping with the central channels, and hence the design starts becoming critical. In this particular case, the number of channels could not be increased any further. Currently, phasar devices being marketed have of the order of 40 channels.

SUMMARY OF THE INVENTION

This invention concerns a method for the production of a dense wavelength division multiplexing (DWDM) device in which there is only one effective order per wavelength (for example, for m=1 in Eq. (1) above) so that the number of channels or images corresponding to different wavelengths is not restricted due to the distance FSR between successive orders. The beams at their focal points will be referred to herein as images. This one-image-only effect is achieved either by irregular sampling of the phasefront at the phased array, and implementing the negative of the phase at each sampling point, or by irregular sampling of the zero-crossings of the phase of the total wavefront at the phased array. The phasefront at the phased array generally includes phase modulation such as linear and/or spherical reference wave modulation. The design utilizes exact computation with the radial distance r rather than its approximations in the cases presented.

The following detailed description includes a description of how to achieve the design in the presence of phase modulation corresponding to a linear as well as a spherical reference wave.

Once the required phase is computed, its implementation in the case of an AWG can be done by choosing the length of each waveguide to yield the required phase. This is the way it is already done with the regular phasar devices with only the linear grating phase modulation in confocal or Rowland geometries. The method is discussed below for illustration purposes with respect to a planar geometry, meaning that the phased array apertures are placed on a plane (line for the 2-D case). Generalization of the results to other geometries can be easily done in light of the teachings herein.

The method has general validity in the sense that it can be used with array waveguide grating (AWG) type of design as well as other forms of phased array devices. The method is also believed to be valid with all types of wave phenomena such as electromagnetic, acoustical, ultrasonic and sound waves.

These and other objects and advantages of the present invention will be more apparent upon reading the following detailed description in conjunction with the accompanying drawings.

| | Values |
|---|---|
| 5 | $M = 100, L = 16, \delta = 15, \Delta\lambda = 0.4$ nm. |
| 6 | $M = 100, L = 16, \delta = 30$. |
| 7 | $M = 100, L = 16, \delta = 15, \Delta\lambda = 0.4$ nm, $r = 0$. |
| 8 | $M = 100, L = 16, \delta = 15, \Delta\lambda = 0.4$ nm, $r = 0.5$. |
| 9 | $M = 100, L = 16, \delta = 40, \Delta\lambda = 0.4$ nm. |
| 10 | $M = 100, L = 64, \Delta\lambda = 0.4$ nm. |
| 11A & B | $M = 300, L = 64, \Delta\lambda = 0.4$ nm. |
| 12A & B | $M = 200, L = 128, \Delta\lambda = 0.2$ nm. |
| 13A & B | $M = 200, L = 256, \Delta\lambda = 0.2$ nm. |
| 14 | $M = 100, L = 32, \delta = 20, \Delta\lambda = 0.4$ nm, Gaussian Aperture. |
| 15 | $M = 100, L = 64, \delta = 20, \Delta\lambda = 0.2$ nm, Gaussian Aperture. |
| 16 | $M = 150, L = 128, \delta = 10, \Delta\lambda = 0.2$ nm, Gaussian Aperture. |

Figure 17:
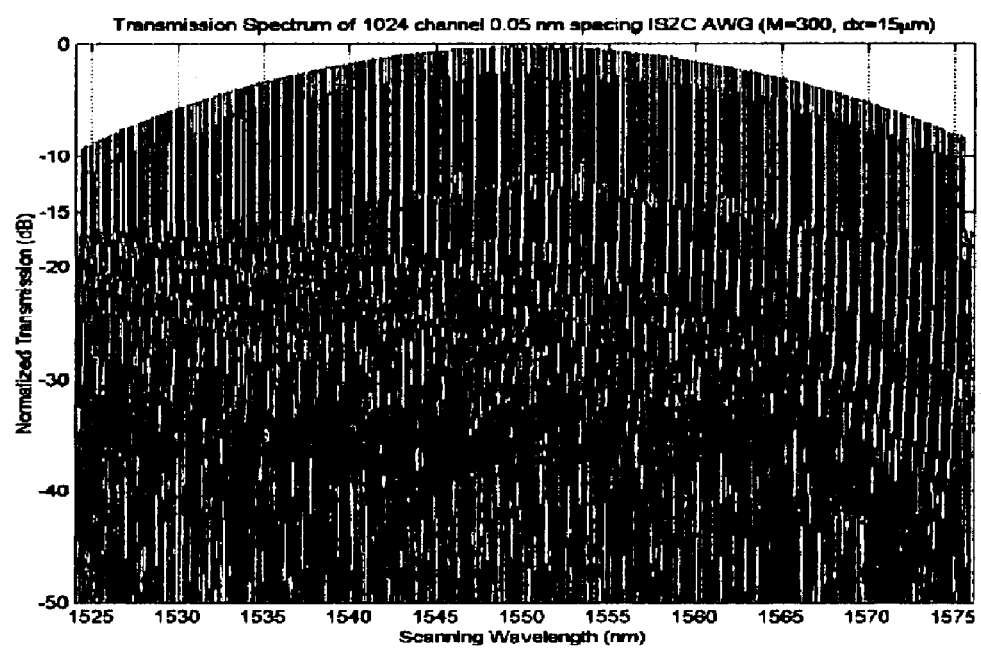

FIG. 17 illustrates a simulation with 1024 channels and finite apertures.

Figure 18:
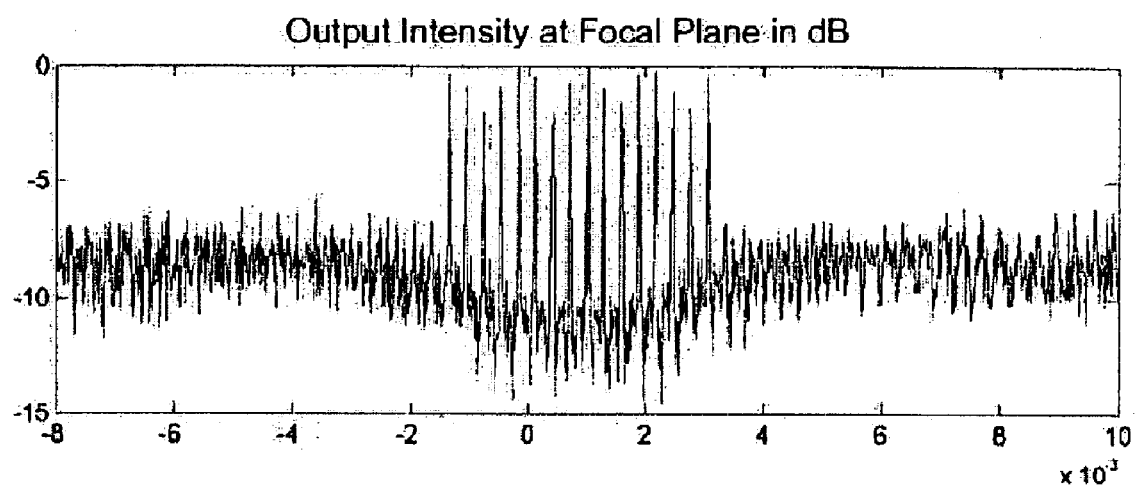

FIG. 18 illustrates a simulation for a 16-channel design with the method of creating the negative phase of the wavefront.

Figure 19:
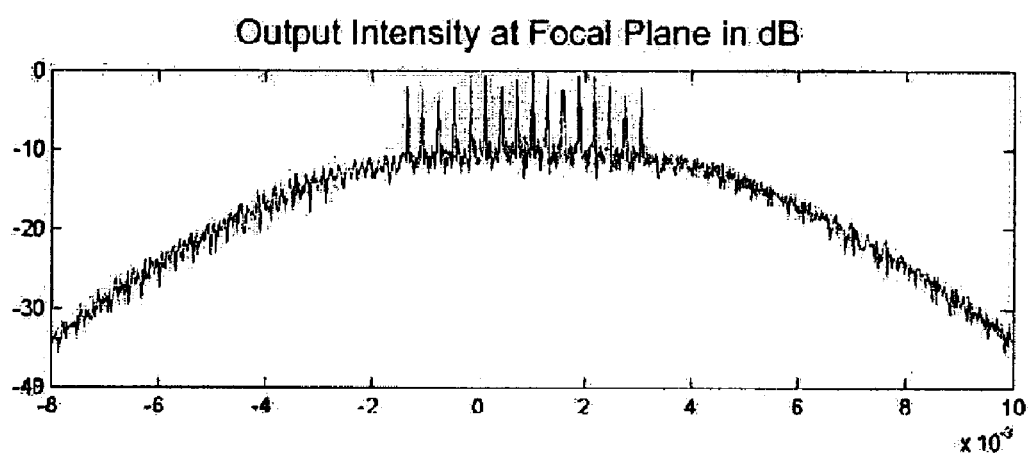

FIG. 19 illustrates a simulation for a 16-channel design with the method of creating the negative phase of the wavefront and with finite apertures.

Figure 20:
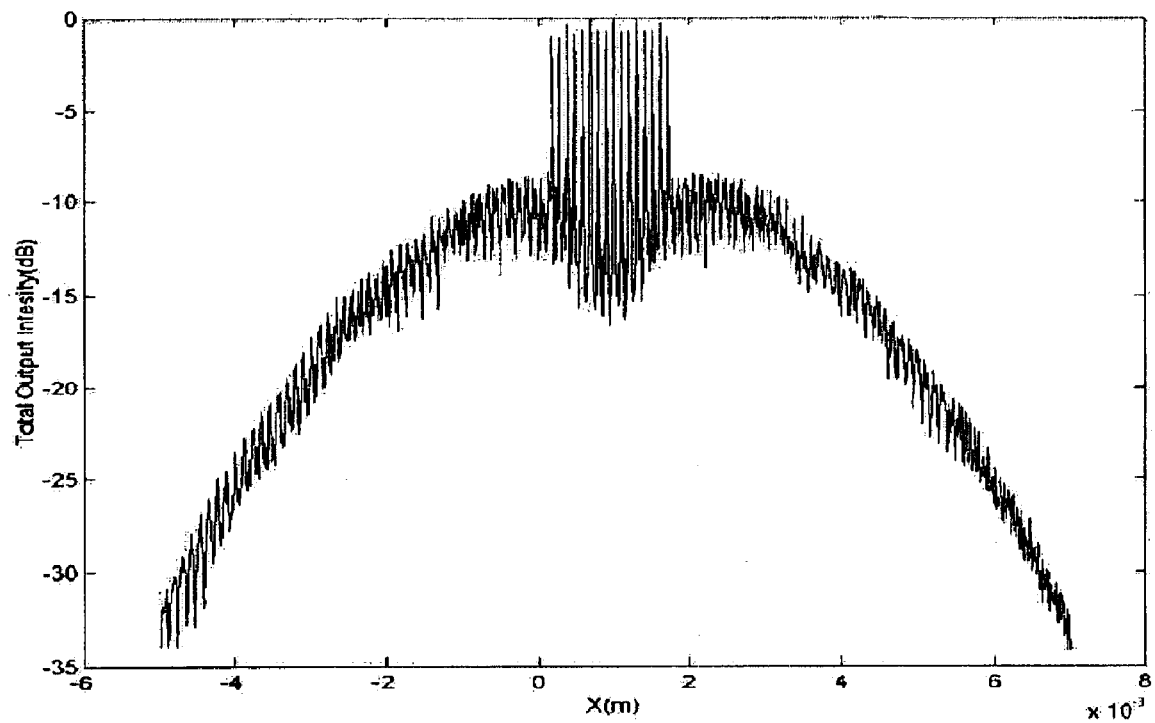

FIG. 20 illustrates a simulation for a 16-channel design with phase errors (ERR=$0.02^\pi$).

Figure 21:
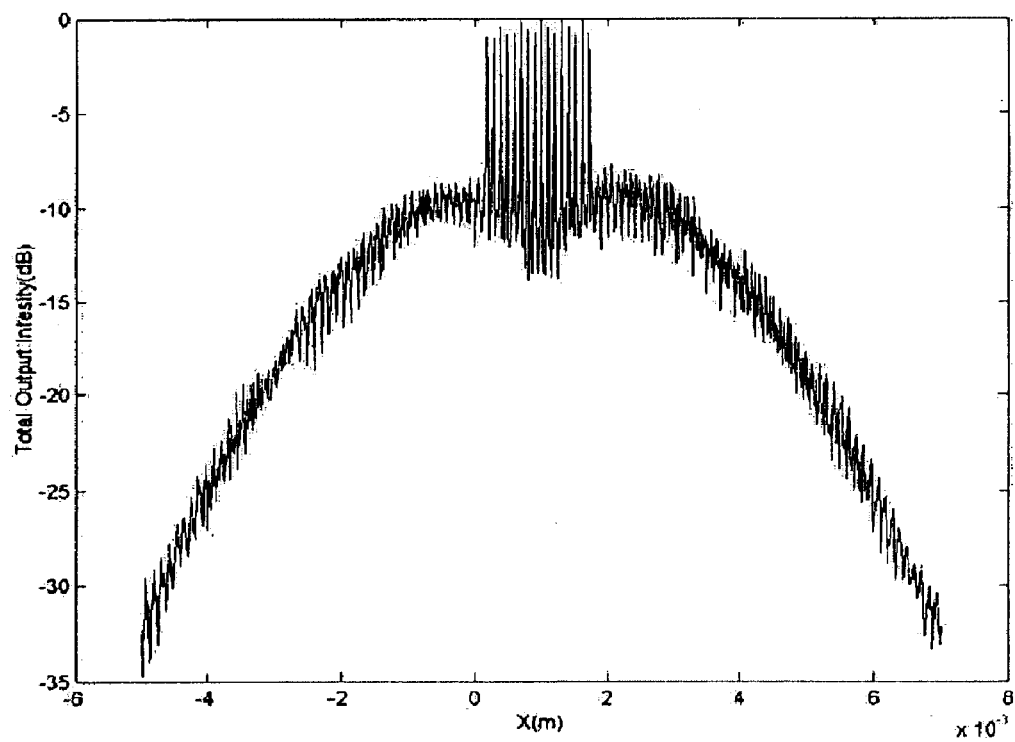

FIG. 21 illustrates a simulation for a 16-channel design with phase errors (ERR=$0.1^\pi$).

Figure 22:
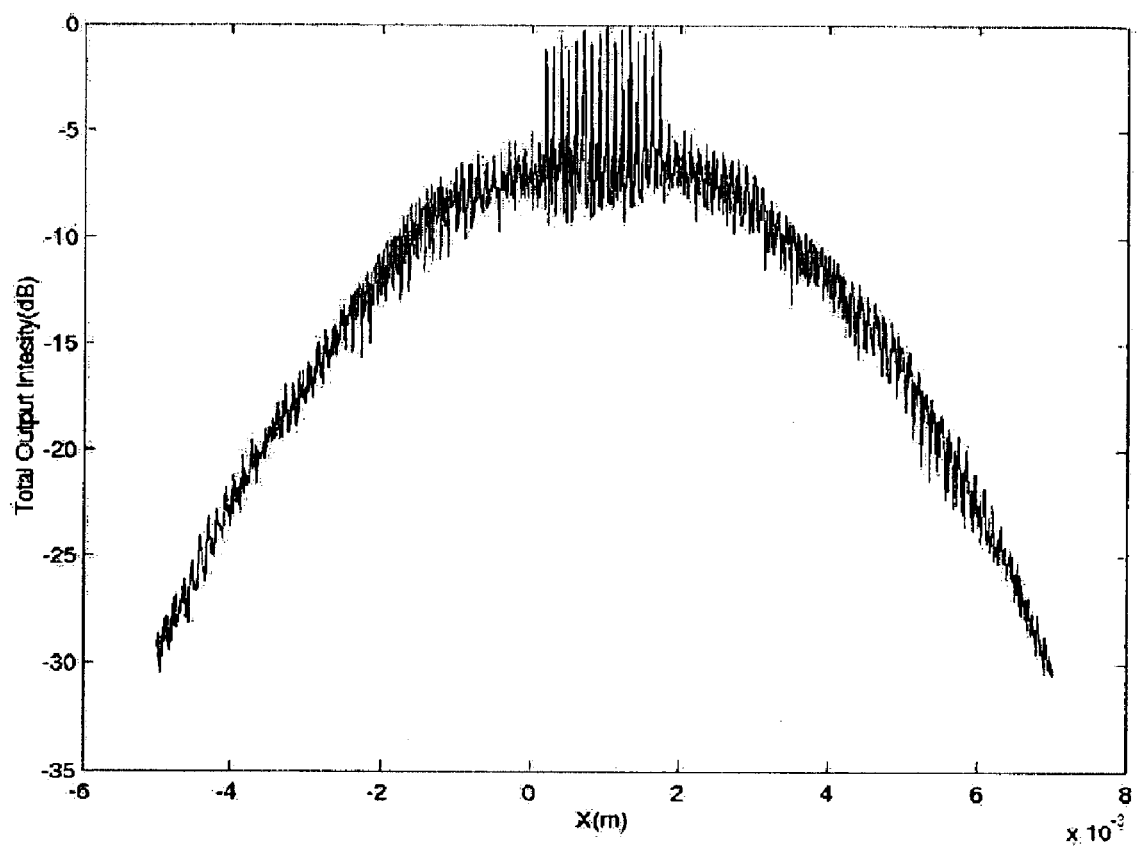

FIG. 22 illustrates a simulation for a 16-channel design with phase errors (ERR=$0.25^\pi$).

Figure 23A:
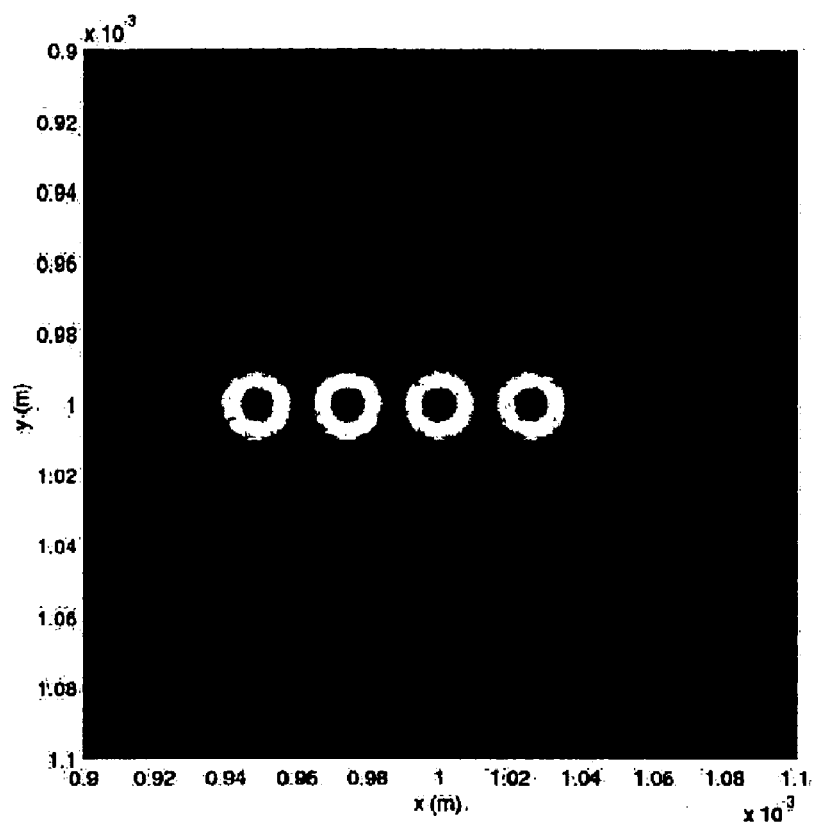

FIGS. 23A and B are examples of 3-D design with 4 wavelengths and exact phase generation.

Figure 24A:
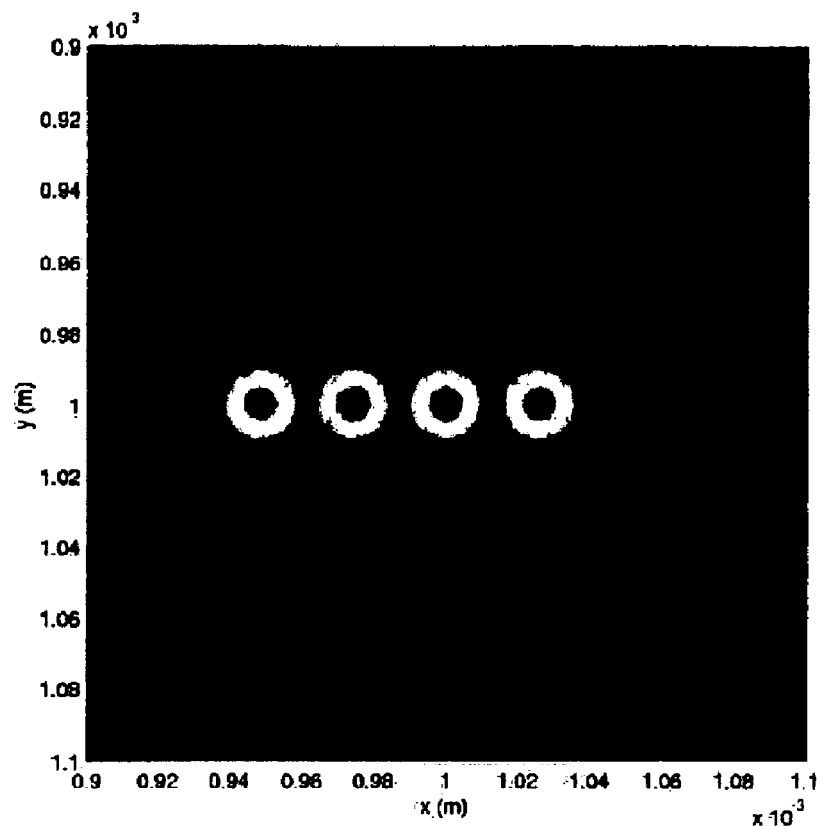

FIGS. 24A and B are examples of 3-D design with 4 wavelengths and 4-level phase quantization.

Figure 25A:
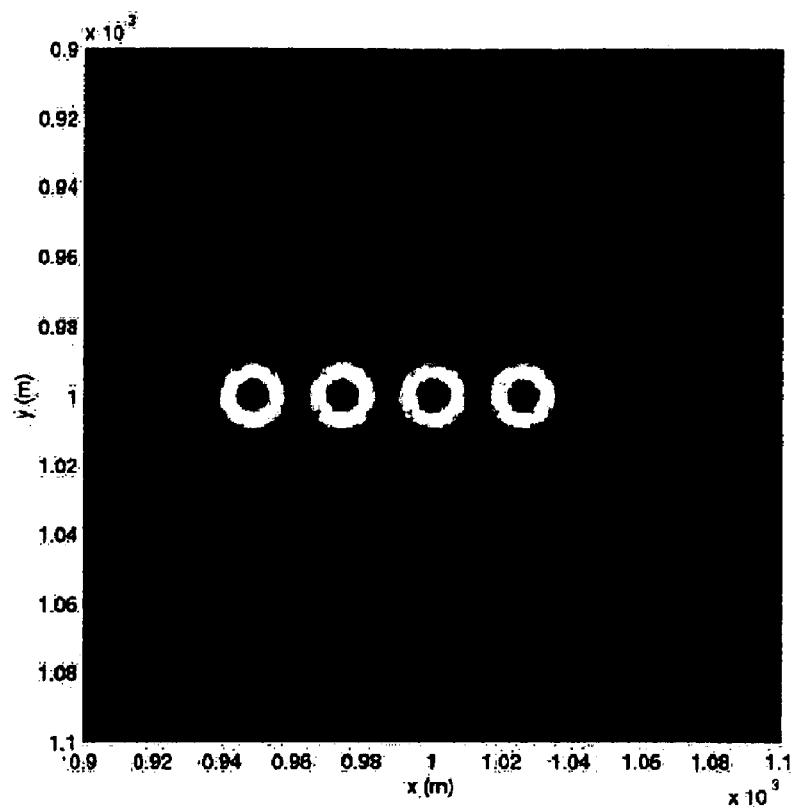

FIGS. 25A and B are examples of 3-D design with 4 wavelengths and 8-level phase quantization.

Figure 26:
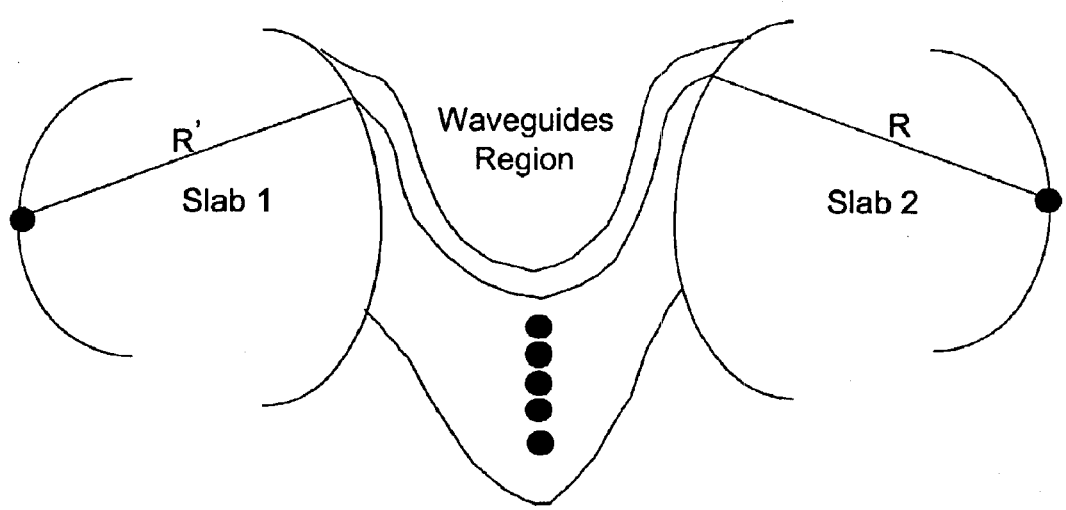

FIG. 26 is a visualization of the Rowland or confocal geometry.

Figure 27:
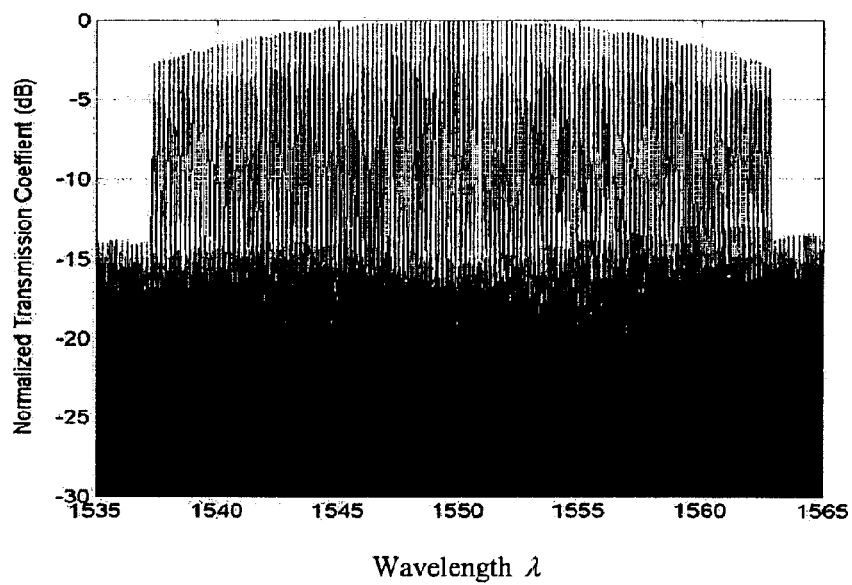

FIG. 27 illustrates a simulation with 128 channels in confocal geometry.

Figure 28:
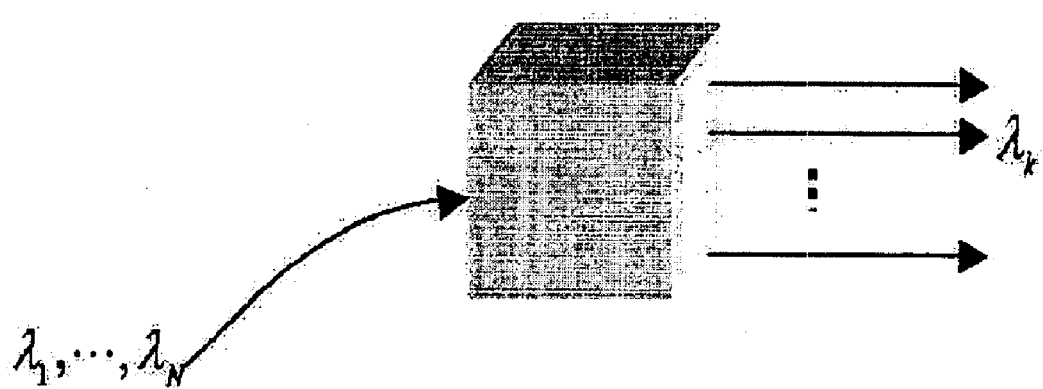

FIG. 28 is a schematic diagram of multiple-channels with a single wavelength.

FIG. 29 shows (A) output intensity of single channel demultiplexing without MMSE(M=200, lambda=1550 nm).

(B) Output intensity of single channel demultiplexing with MMSE (M=200, lambda=11550 nm).

Figure 30A:
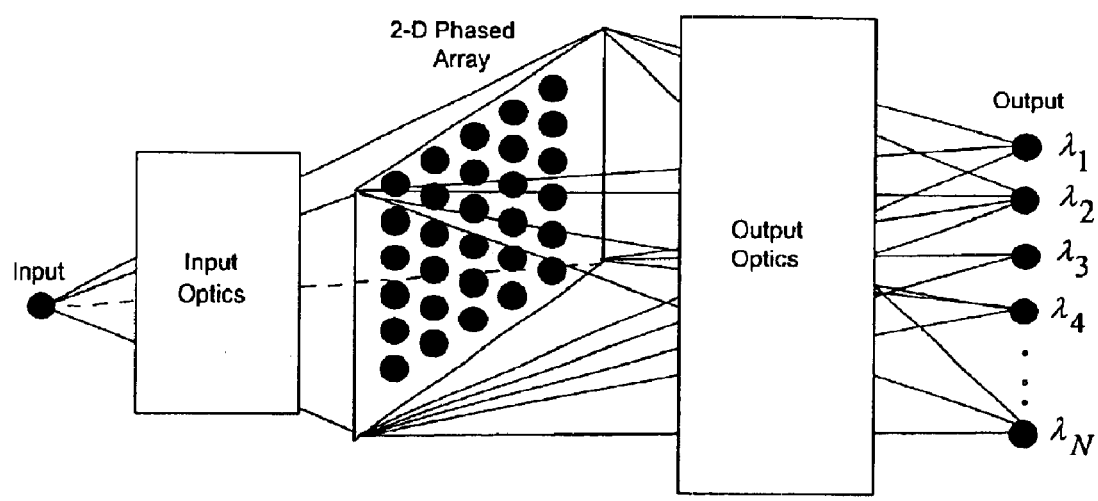

FIGS. 30A and B are visualizations of a possible setup in 3-D.

Figure 31:
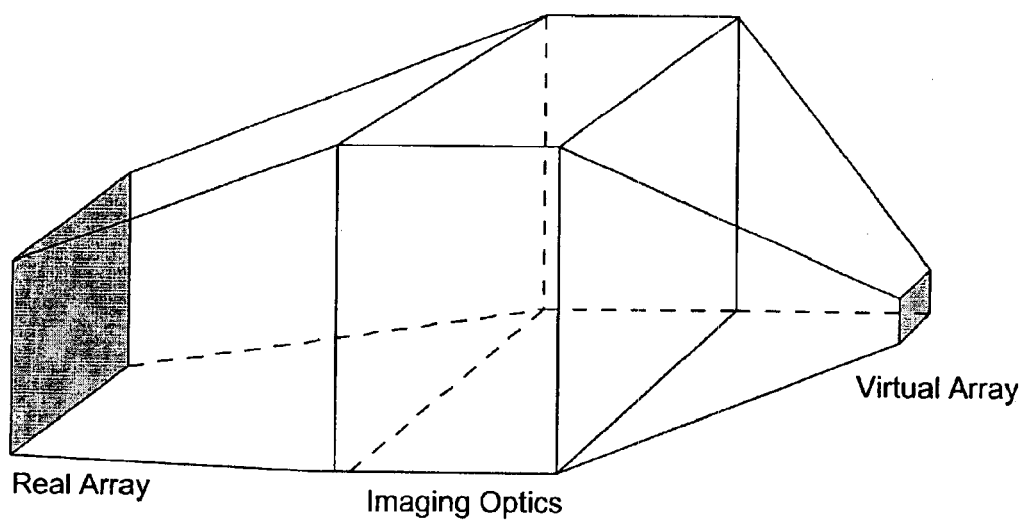

FIG. 31 is the visualization of a virtual holography setup in connection with FIG. 26 to achieve desired phase.

Figure 32:
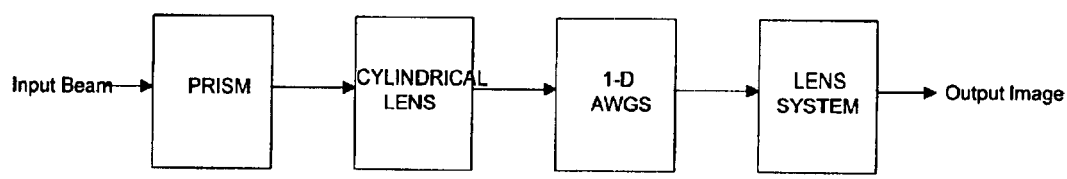

FIG. 32 is a schematic diagram of a 3-D design with optical components and 2-D AWGs.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

1. Method of Irregularly Sampled Zero-Crossings (MISZC)

The method is based on first randomly choosing locations of centers of radiating apertures and then either by creating the negative phase of the phasefront (possibly plus a constant) at the chosen locations so that the overall phase is zero (or a constant), or slightly adjusting locations of centers of radiating apertures such that the total phase shift from such a center to the desired image point equals a constant value, say, zero modulo $2\pi$. In both approaches, such points will be referred to as zero-crossings. In the second approach, they will be referred to as automatic zero-crossings. The total number of zero-crossings can be a very large number, especially in the presence of linear and spherical phase modulation. Practical implementations allow only a small number of apertures, for example, 300 being a typical number in the case of phasars. In order to avoid the problem of too many apertures, and to avoid harmonics generated due to regular sampling, we choose irregularly sampled sparse number of apertures. One way to determine zero-crossing locations is given below as a procedure.

Step 1. The aperture points are initialized by choosing one point at a time randomly along the phased array surface. In order to achieve this systematically on the total surface of the phased array, the following approach can be used:

Initial point locations=uniformly-spaced point locations +small random shifts

Step 2(a). If the method of creating the negative phase of the phasefront at the chosen locations is used, the said phase is created physically, for example, by correctly choosing the lengths of the waveguides in the case of phasar devices.

Step 2(b). If the method of automatic zero-crossings is used, correction values are calculated for each of the initial points obtained in step 1 to find the nearest zero-crossing points as Final locations of zero-crossings=Initial point locations from step 1+correction terms The two approaches work similarly. Below we discuss one algorithm to calculate the correction terms to generate the automatic zero-crossings.

1.1. Computational Method for Calculating the Correction Terms

Figure 1:
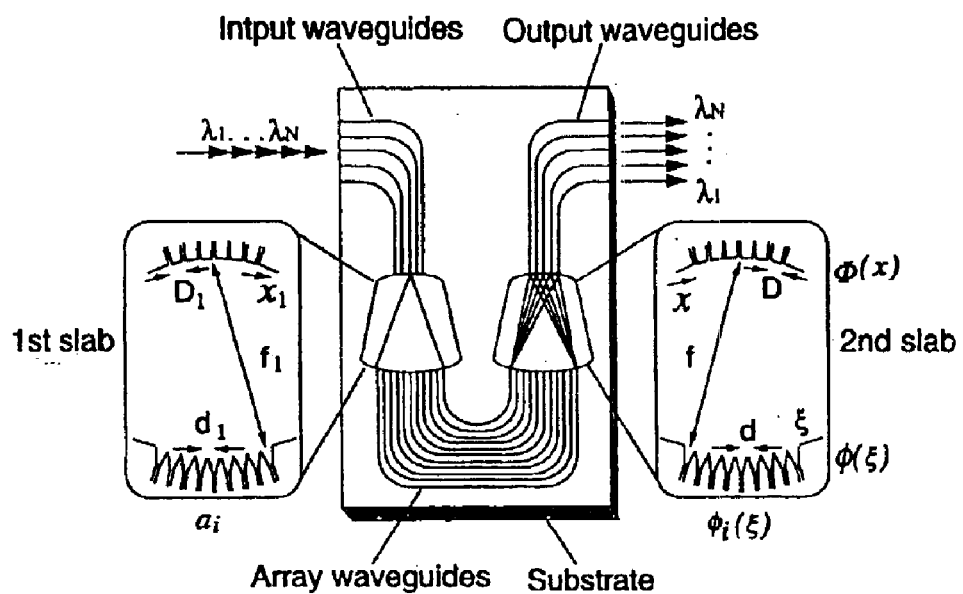
FIG. 1 is a schematic for a conventional arrayed waveguide grating (AWG) device.
Figure 2:
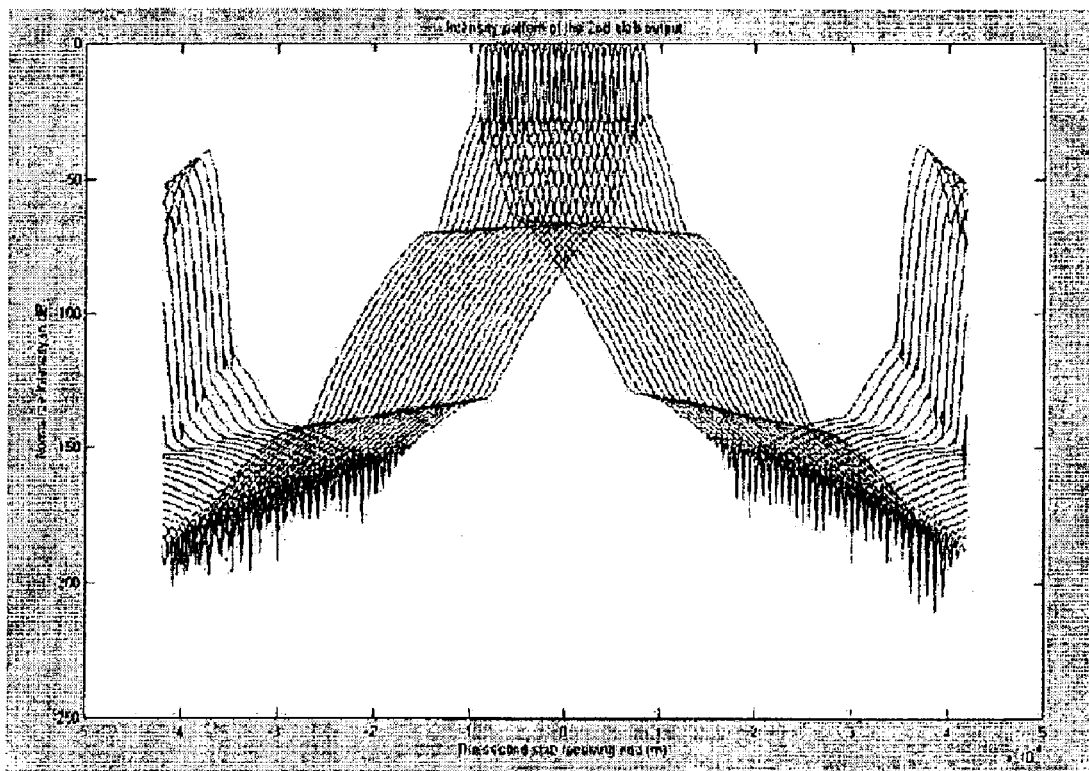
FIG. 2 is an example of simulation results for an AWG device of the type shown in FIG. 1, and, more specifically, the output of a 16-channel phasar at a center wavelength of 1.550 microns, and channel spacing of 0.8 microns.
Figure 3:
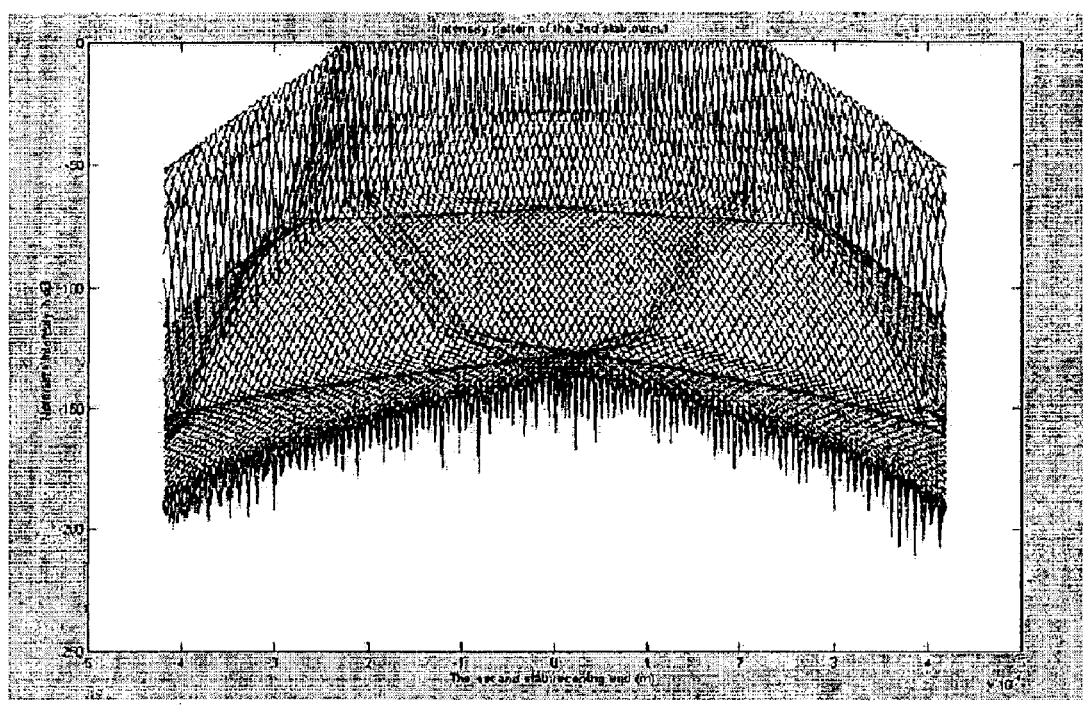
FIG. 3 is another example of simulation results for an AWG device of the type shown in FIG. 1, in this case the output of a 64-channel phasar at a center wavelength of 1.550 channel spacing of 0.8 microns.
Figure 4:
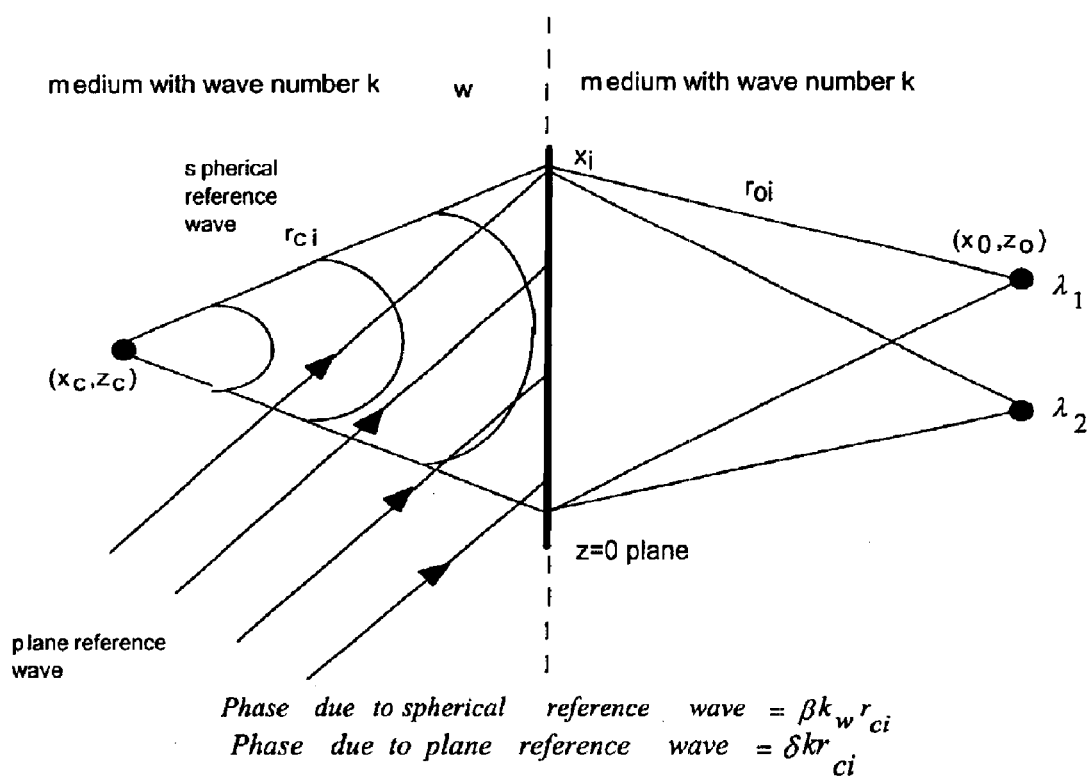
FIG. 4 is a holographic visualization of the modeling equation (1).

In geometries which are used to generate a phased array device, there are phases generated due to linear phase modulation and propagation of the wave from one point to another. A spherical phase modulation can also be considered. In analogy to holography, this can be modeled as shown in FIG. 4. There is however a major difference. When the linear and/or spherical phase modulation terms are achieved by controlling the lengths of waveguides, the constants in front of the modulating terms (for example, ι and β in Eq. (10) below) can be chosen much larger than what is possible if physical plane and/or spherical reference waves were actually used.

Consistent with the teachings of my journal article entitled "One-Image-Only Digital Holography," Optik, Vol. 53, pp. 47–62, April 1979, the modeling phase equation will be written as $$\delta k_w' x_i + \beta k_w' r_{ci} + k' r_{oi} = 2n\pi + \phi_0 \quad (10)$$

where $k'$ is the wave number for the wave at wavelength $\lambda_1$ in a physical medium; $r^{ci}$ is the radial distance to the focal point at coordinates $(x_0, y_0)$ of a spherical reference wave; $k_w'$ is the wave number at wavelength $\lambda_1$ for the medium in which linear and spherical phase modulation are physically generated; δ and β are user-defined constants as discussed earlier (they are physically implemented by a delay mechanism such as propagation distance in a medium during manufacture); $x_i$ is the x-coordinate of an aperture location on the phased array; $r_0$ is the radial distance from the center of an aperture on the phased array to the image point at wavelength $\lambda_1$, n is an integer, and $\phi_0$ is a user-chosen constant phase. The variables and constants involved are also illustrated in FIG. 4 in which z=0 plane is assumed to be the plane on which the waveguides end. This will be assumed to be Case I. In Case II, z=0 plane will be replaced by a spherical surface as in the confocal or Rowland geometry so that $r_{oi}$ is constant. Case II is discussed in Section 3.1. For the sake of simplicity, we will assume all the wave numbers are the same, and β=1 below. We also note that in the 2-D case, plane refers to a line, and spherical surface refers to a circle. We discuss Case I below.

Eq. (10) can be written as $$k'(r_{ci} + x_i \delta + r_{oi}) = n\lambda + \phi_0 \lambda / 2\pi \quad (11)$$

We have $$r_{oi} = \sqrt{(x_o - x_i)^2 + z_o^2}$$

$$r_{ci} = \sqrt{(x_c - x_i)^2 + z_c^2} \quad (12)$$

Let $x_i$ be a guess value, and $x_i' = x_i + \Delta$ be the corrected $x_i$ value to be determined. We can write $$r_{ci} + r_{oi} \delta x_i = r_{ci}' + r_{oi}' + \delta x_i' + B \quad (13)$$

where B is the amount by which the right-hand side of Eq. (13) is greater than nλ.
Let $$X_c = x_c - x_i$$

$$X_o = x_o - x_i \quad (14)$$

Rewriting $$r'_{oi} = \sqrt{(x_o - x'_i)^2 + z_o^2} = \sqrt{(x_o - x_i - \Delta)^2 + z_o^2} = \sqrt{r_{oi}^2 - 2\Delta X_o + \Delta^2}$$

$$r'_{ci} = \sqrt{(x_c - x'_i)^2 + z_c^2} = \sqrt{(x_c - x_i - \Delta)^2 + z_c^2} = \sqrt{r_{ci}^2 - 2\Delta X_c + \Delta^2} \quad (15)$$

Equation (13) can be written as $$(r'_{ci} + r'_{oi})^2 = (r_{ci} + r_{oi} \delta \Delta - B) \quad (16)$$

The left-hand side (LHS) and the right-hand side (RHS) of Eq. (16) can be expanded as $$LHS = r_{ci}^2 - 2\Delta X_c + \Delta^2 + r_{oi}^2 - 2\Delta X_o + \Delta^2 + \quad (17)$$

$$2\left(\sqrt{(r_{oi}^2 - 2\Delta X_o + \Delta^2)(r_{ci}^2 - 2\Delta X_c + \Delta^2)}\right)$$

$$= r_{ci}^2 + r_{oi}^2 - 2\Delta(X_c + X_o) + 2\Delta^2 +$$

$$2\sqrt{(r_{oi}^2 - 2\Delta X_o + \Delta^2)(r_{ci}^2 - 2\Delta X_c + \Delta^2)}$$

$$RHS = (r_{ci} + r_{oi} - B)^2 + (\delta\Delta)^2 - 2(r_{ci} + r_{oi} - B)\delta\Delta \quad (18)$$

$$= r_{ci}^2 + r_{oi}^2 + 2r_{ci}r_{oi} + B^2 - 2B(r_{ci} + r_{oi}) +$$

$$(\delta\Delta)^2 - 2(r_{ci} + r_{oi} - B)\delta\Delta$$

Equating both sides, we get $$2\sqrt{(r_{oi}^2 - 2\Delta X_o + \Delta^2)(r_{ci}^2 - 2\Delta X_c + \Delta^2)} = 2r_{ci}r_{oi} + B^2 - 2B(r_{ci} + r_{oi}) + (\delta\Delta)^2 - 2(r_{ci} + r_{oi} - B)\delta\Delta \quad (19)$$

Dividing by 2 and squaring both sides, we have $$(r_{oi}^2 - 2\Delta X_o + \Delta^2)(r_{ci}^2 - 2\Delta X_c + \Delta^2) = \quad (20)$$

$$\left[r_{ci}r_{oi} + \frac{B^2}{2} - B(r_{ci} + r_{oi}) + \frac{(\delta\Delta)^2}{2} - (r_{ci} + r_{oi} - B)\delta\Delta\right]^2$$

The left-hand side (LHS) and the right-hand side (RHS) of Eq. (20) can be expanded as $$LHS = \Delta^4 + \Delta^3(-2X_c - 2X_o) + \Delta^2(4X_c X_o + r_{oi}^2 + r_{ci}^2) + \Delta(-2X_c r_{oi}^2 - 2X_o r_{ci}^2) + r_{oi}^2 r_{ci}^2$$

$$RHS =$$

$$\left\{\Delta^2\left(\frac{\delta^2}{2} - 1\right) + \Delta[-(r_{ci} + r_{oi} - B)\delta + (X_c + X_o)] + r_{ci}r_{oi} + \frac{B^2}{2} - B(r_{ci} + r_{oi})\right\}^2$$

or $$RHS = [\Delta^2 G_1 + \Delta G_2 + G_3]^2 = \Delta^4 G_1^2 + \Delta^3(2G_1 G_2) + \Delta^2(G_2^2 + 2G_1 G_3) + \Delta(2G_2 G_3) + G_3^2$$

where $$G_1 = \left(\frac{\delta^2}{2} - 1\right)$$

$$G_2 = -(r_{ci} + r_{oi} - B)\delta + (X_c + X_o)$$

$$G_3 = r_{ci}r_{oi} + \frac{B^2}{2} - B(r_{ci} + r_{oi})$$

Equating the two sides yields $$\Delta^4 C_4 + \Delta^3 C_3 + \Delta^2 C_2 + \Delta C_1 + C_0 = 0 \quad (21)$$

where $$C_4 = G_1^2 - 1$$

$$C_3 = 2G_1 G_2 + 2X_c + 2X_o$$

$$C_2 = G_2^2 + 2G_1 G_3 - 4X_c X_o - r_{oi}^2 - r_{ci}^2$$

$$C_1 = 2G_2 G_3 + 2X_c r_{oi}^2 + 2X_o r_{ci}^2$$

$$C_0 = G_3^2 - r_{oi}^2 r_{ci}^2 \quad (22)$$

The solution to the 4$^{th}$ order polynomial equation (21) is the correction to be made on the initial random choice of $x_i$. The locations of the chosen zero-crossing sampling points correspond to the positions of the waveguide apertures on the phased array surface in the case of phasar devices.

1.2. Extension of the Method to 3-D Geometry

Extension to 3-D geometry is useful because other technologies can also be used. For example, the ends of arrayed waveguides can be arranged in a 2-D plane or a 2-D curvature, instead of along a 1-D line or 1-D curvature treated in the previous discussion. Other technologies could be potentially used. One such technology would be scanning electron beam microscopes and reactive ion etching systems which are used for manufacturing diffractive optical elements. See, e.g., O. K. Ersoy, "Construction of Point Images with the Scanning Electron Microscope: A Simple Algorithm," *Optik*, Vol. 46, pp. 61–66, September 1976. Another such technology would be laser fabrication of 3-D waveguides in a material such as glass. See, e.g., K. Hirao and K. Miura, "Writing Waveguides and Gratings in Silica and Related Materials by a Femtosecond Laser," Journal of Non-Crystalline Solids, 239(1–3), 91–95, 1998.

The basic method in 3-D is conceptually the same as before. In other words, locations of centers of radiating apertures are first randomly chosen; then either the negative phase of the phasefront (possibly plus a constant) at the chosen locations so that the overall phase is zero (or a constant) is physically generated, or locations of centers of radiating apertures are slightly adjusted so that the total phase shift from such a center to the desired image point equals a constant value, say, zero modulo $2\pi$.

In the case of choosing automatic zero-crossings in Case I, Eq. (21) is still valid if adjustment is done only along the x-direction, and the following replacements are made:

$$z_o^2 \rightarrow z_o^2 + (y_o - y_i)^2$$

$$z_c^2 \rightarrow z_c^2 + (y_c - y_i)^2$$

Similar conclusions are valid in Case II.

1.3. Analysis of the Method

The method discussed above is effective to remove the bottleneck of higher order harmonic images. In this section, an analysis is provided to explain why this is the case. The analysis is given in 3 dimensions. In planar devices such as optical phasars, two dimensions are used. The 2-dimensional analysis is achieved simply by skipping one dimension, say, they variable from the equations.

The MISZC is a nonlinear encoding method. In general, with a sampled nonlinear encoding technique, the harmonic images are generated due to two mechanisms: (1) regular sampling, (2) nonlinear encoding. In MISZC, harmonic images due to regular sampling are converted in to tolerable background noise by irregular sampling. The analysis of why the harmonic images due to nonlinear encoding of phase such as with zero-crossings are also eliminated in the presence of phase modulation is given below.

Equation (10) can be more generally written as $$\phi(x_i, y_i) + \theta(x_i, y_i) + kr_{oi} = 2n\pi + \phi_0 \quad (23)$$

where $\phi(x_i, y_i)$ is the phase shift caused by the wave propagation from the origin of the spherical reference wave $(x_c, y_c, z_c)$ to the ith coupling aperture $(x_i, y_i)$ on the surface of the phased array; $\theta(x_i, y_i)$ is another phase shift, for example, the linear phase shift in Eq. (10); $kr_{oi}$ is the phase shift caused by the wave propagation from the aperture $(x_i, y_i)$ on the surface of the phased array to the image point (object point) located at $(x_o, y_o, z_o)$. In a phasar device, $\theta(x_i, y_i)$ can be expressed as $n_c k \alpha x_i$, where $n_c$ is the effective index inside the waveguide.

For the center wavelength $\lambda$, Eq.(23) is written as $$kr_{ci} + nkx_i\alpha + kr_{oi} = 2n\pi + \phi_0 \quad (24)$$

Based on paraxial approximation, we write $$r_{oi} = \sqrt{(x_o - x_i)^2 + (y_o - y_i)^2 + z_o^2} \cong \quad (25)$$

$$z_o + \frac{x_o^2 + y_o^2 + x_i^2 + y_i^2}{2z_o} - \frac{x_o x_i + y_o y_i}{z_o}$$

$$r_{ci} = \sqrt{(x_c - x_i)^2 + (y_c - y_i)^2 + z_c^2} \cong$$

$$z_c + \frac{x_c^2 + y_c^2 + x_i^2 + y_i^2}{2z_c} - \frac{x_c x_i + y_c y_i}{z_c}$$

Substituting Eq.(25) into Eq.(24) and neglecting constant phase terms results in $$x_i \delta - x_i \left( \frac{x_c}{z_c} + \frac{x_o}{z_o} \right) + \frac{x_i^2}{2} \left( \frac{1}{z_o} + \frac{1}{z_c} \right) = n\lambda \quad (26)$$

where $\delta = n_c \alpha$. Now Eq.(26) is applied to another wavelength $\lambda'$, which images at $(x_0', z_0')$. Taking the ratio of the two equations, we get $$\frac{x_i \delta - x_i \left( \frac{x_c}{z_c} + \frac{x_o}{z_o} \right) + \frac{x_i^2}{2} \left( \frac{1}{z_o} + \frac{1}{z_c} \right)}{x_i \delta - x_i \left( \frac{x_c}{z_c} + \frac{x_o}{z_o} \right) + \frac{x_i^2}{2} \left( \frac{1}{z_o'} + \frac{1}{z_c} \right)} = \frac{\lambda}{\lambda'} = R \quad (27)$$

By solving the above system, the new focal point $(x_0', z_0')$ is obtained as $$z_o' = \frac{R}{\frac{1-R}{z_c} + \frac{1}{z_o}} \approx R z_o \quad (28)$$

$$x_o' = \frac{\frac{x_o}{z_o} - (1-R)\left(\delta - \frac{x_c}{z_c}\right)}{\frac{1-R}{z_c} + \frac{1}{z_o}} \approx x_o - z_o(1-R)\left(\delta - \frac{x_c}{z_c}\right)$$

given that $1-R \ll 1$ and $z_c \ll z_o$.

From the above derivation, it is observed that the focal point location $z_o'$ is very close to the original $z_o$. This dictates that the focal points for different wavelength components are focused relatively closely in the z-direction, as expected. Along the x-direction, the dispersion relationship is given as $$\Delta x_o = x_o' - x_o = -z_o(1-R)\left(\delta - \frac{x_c}{z_c}\right) \quad (29)$$

$$\left| \frac{\Delta x_o}{\Delta \lambda} \right| \approx \frac{z_o}{\lambda} \left| \delta - \frac{x_c}{z_c} \right|$$

The image points of higher harmonics due to nonlinear encoding with zero-crossings occur when the imaging equation satisfies $$x_i \delta - x_i \left( \frac{x_c}{z_c} + \frac{x_o'}{z_o'} \right) + \frac{x_i^2}{2} \left( \frac{1}{z_o'} + \frac{1}{z_c} \right) = nm\lambda' \quad (30)$$

-continued $$\frac{x_i\delta - x_i\left(\frac{x_c}{z_c} + \frac{x_o}{z_o}\right) + \frac{x_i^2}{2}\left(\frac{1}{z_o} + \frac{1}{z_c}\right)}{x_i\delta - x_i\left(\frac{x_c}{z_c} + \frac{x_o'}{z_o'}\right) + \frac{x_i^2}{2}\left(\frac{1}{z_o'} + \frac{1}{z_c}\right)} = \frac{\lambda}{m\lambda'} = \frac{R}{m}$$

Solving for $x_O$ and $z_O$ in the same way, we obtain the higher order harmonic image points as $$z_o' = \frac{R}{\frac{m-R}{z_c} + \frac{m}{z_o}} \quad (31)$$

$$x_o' = \frac{\frac{mx_o}{z_o} - (m-R)\left(\delta - \frac{x_c}{z_c}\right)}{\frac{m-R}{z_c} + \frac{m}{z_o}}$$

From the above equations, we observe that a significant move of imaging position in the z-direction occurs as $z_o'$ shrinks with increasing harmonic order. This means that the higher harmonics are forced to move towards locations very near the phased array. However, at such close distances to the phased array, the paraxial approximation is not valid. Hence, there is no longer any valid imaging equation. Consequently, the higher harmonics turn in to noise. It can be argued that there may still be some imaging equation even if the paraxial approximation is not valid. However, the simulation results discussed in Section 2 indicate that there is no such valid imaging equation, and the conclusion that the higher harmonic images turn in to noise is believed to be valid.

1.4. Dispersion Analysis

The analysis in this subsection is based on the simulation results from Eqs.(27) and (31) in the previous subsection.

Case 1: Spherical Wave Case ($0.1 < z_c/z_o < 10$)

For the first order harmonics (m=1), the positions of desired focal point for $\lambda'$, i.e., $x_0'$ and $z_0'$ have linear relationship with the wavelength $\lambda'$. The slope decreases when the ratio decreases. For the higher order harmonics (m≧2), $x_0'$ is much greater than $x_0=0$ and $z_0'$ is much less than $z_0$. Therefore we conclude that the higher order harmonics turn in to background noise as discussed in the previous subsection.

Case 2: Plane Wave Case ($z_c/z_o >> 1$)

In this case, Eqs. (27) and (31) can be simplified as $$z_o' = \frac{R}{\frac{m-R}{z_c} + \frac{m}{z_o}} \approx \frac{R}{m} z_o \approx \frac{1}{m} z_o \quad (32)$$

$$x_o' = \frac{\frac{mx_o}{z_o} - (m-R)\left(\delta - \frac{x_c}{z_c}\right)}{\frac{m-R}{z_c} + \frac{m}{z_o}} \approx x_0 - z_0\left(1 - \frac{R}{m}\right)\left(\delta - \frac{x_c}{z_c}\right)$$

Then, the dispersion relations for the first order (m=1) are derived as $$\Delta z = z_o - z_o = z_o\left(\frac{\lambda}{\lambda'} - 1\right) = z_o \frac{-\Delta\lambda}{\lambda'}, \left|\frac{\Delta z}{\Delta\lambda}\right| \approx \frac{z_o}{\lambda} \quad (33)$$

$$\Delta x \approx -z_0(1-R)\left(\delta - \frac{x_c}{z_c}\right), \left|\frac{\Delta x}{\Delta\lambda}\right| \approx \frac{z_0}{\lambda}\left|\delta - \frac{x_c}{z_c}\right|$$

3-D Dispersion

The mathematical derivation for the 3-D case is very much similar to that for 2-D case discussed before. However, instead of viewing the y variables as constants, thus neglecting them in the derivation, we investigate the y variables along with x variables, and then obtain independent equations that lead to dispersion relations in both x-direction and y-direction. It is concluded that if the x-coordinates and y-coordinates of the points are chosen independently, the dispersion relations in both directions are given by $$\Delta x \approx -z_0(1-R)\left(\delta_x - \frac{x_c}{z_c}\right), \left|\frac{\Delta x}{\Delta\lambda}\right| \approx \frac{z_0}{\lambda}\left|\delta_x - \frac{x_c}{z_c}\right|$$

$$\Delta y \approx -z_0(1-R)\left(\delta_y - \frac{y_c}{z_c}\right), \left|\frac{\Delta y}{\Delta\lambda}\right| \approx \frac{z_0}{\lambda}\left|\delta_y - \frac{y_c}{z_c}\right|$$

1.5. Finite-Sized Apertures: the Example of Radiation Fields from Waveguides

The apertures of the phased array have thus far been assumed to be point sources. In general, this assumption works well provided that the phase does not vary much within each aperture. In addition, since we choose zero-crossings to be the centers of the apertures, there is maximal tolerance to phase variations, for example, in the range $[-\pi/2, \pi/2]$. In this section, we consider phasar type of devices in which phase modulation is controlled by waveguides truncated at the surface of the phased array.

We use a cylindrical coordinate system $(r,\phi,z)$ to denote points on an aperture, and a spherical coordinate system $(R,\Theta,\Phi)$ for points outside the aperture. In terms of these variables, the Fresnel-Kirchhoff diffraction formula for radiation fields in the Fraunhofer or far field is given by $$E(R, \Theta, \Phi) = jk \frac{e^{-jkR}}{2\pi R} \frac{1+\cos\Theta}{2} \int_S E(r, \phi, 0) e^{jkr\sin\Theta\cos(\Phi-\phi)} r\, dr\, d\phi \quad (34)$$

The transverse electric field of the $LP_{01}$ mode may be accurately approximated as a Gaussian function:

$$E(r,\phi,0) = E_0 e^{-r^2/w^2} \quad (35)$$

where w is the waist radius of the gaussian beam. The field in the Fraunhofer region radiated by such a Gaussian field is obtained by substituting Eq. (35) into Eq. (34). The result is given by $$E(R, \Theta, \Phi) = E(R, \Theta) = jkE_0 \frac{e^{-jkR}}{R} \frac{w^2}{2} e^{-(kw\sin\Theta)^2/4} \quad (36)$$

The far field approximation is valid with the very small sizes of the apertures. Eq. (36) is what is utilized in simulation of designed phased arrays with finite aperture sizes in Section 2.2.

2. Simulation Results

We first define the parameters used to illustrate the results as follows:

M: the number of phased array apertures (equal to the number of waveguides used in the case of phasar)

L: The number of channels (wavelengths to be demultiplexed)

ΔX: The wavelength separation between channels r: random coefficient in the range of [0,1] defined as the ratio of the random shift less than or equal to the range of uniform spacing length Δ and the uniform spacing length Δ (hence the random shift equals ±rΔ)

δ: the parameter defined in Section 1.1

The results are shown in FIGS. 5 through 16. The title of each figure also contains the values of the parameters used.

Unless otherwise specified, r is assumed to be 1. In the first part of the simulations (FIGS. 5 through 13), the apertures of the phased array are assumed to be point sources. In the second part of the simulations, the real world case of finite sized apertures are considered. Below we describe the results in detail.

2.1. Point-Source Apertures

Figure 5:
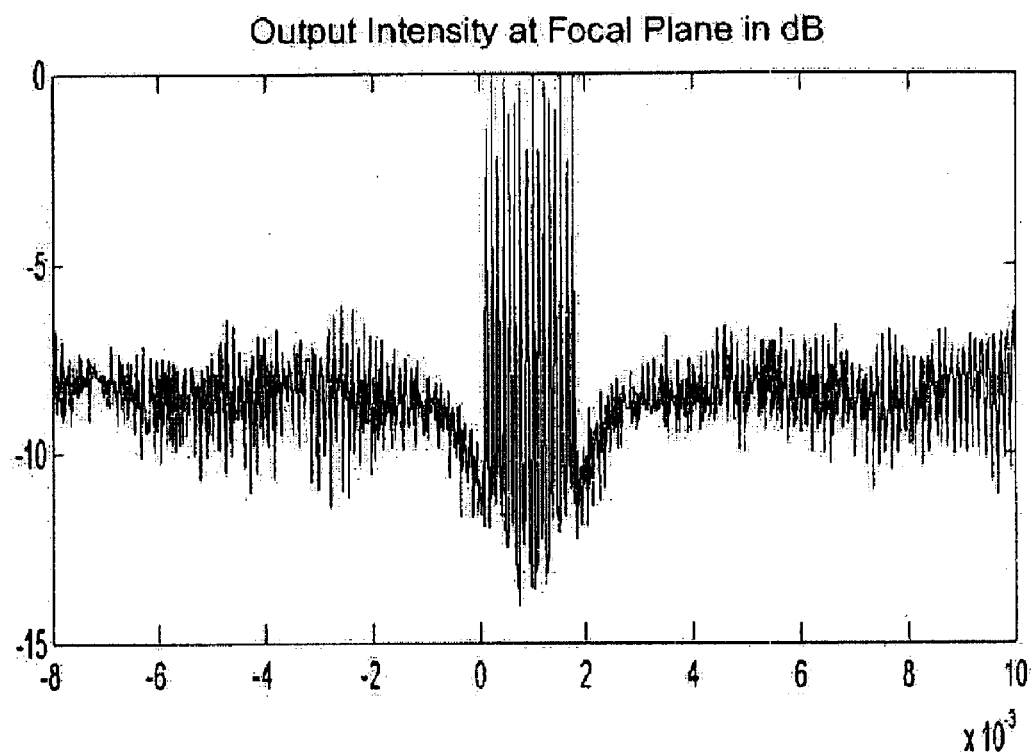
FIGS. 5–16 are simulation results for the present invention, with the following parameter values described herein.

FIG. 5 shows the intensity distribution on the image plane and the zero-crossing locations of the phased array with 16 channels when the central wavelength is 1550 nm, and the wavelength separation is 0.4 nm between adjacent channels. There are no harmonic images observed on the output plane which is in agreement with the analysis in Section 1.

Figure 6:
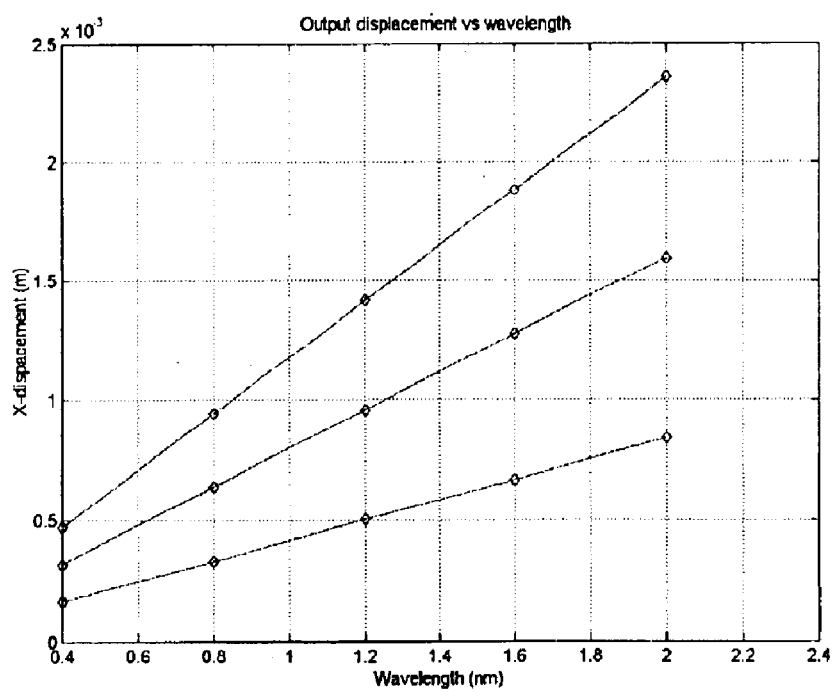

In order to verify the dispersion relation given by Eq. (33), the linear relationship of $\Delta x$ with respect to $\Delta \lambda$, $\delta$, and different values of $z_0$ were investigated, respectively. The simulation results shown in FIG. 6 give the slope of each straight line as 1.18, 0.78, 0.40 ($\times 10^6$), which are in excellent agreement with the theoretically calculated values from Eq.(33) with $\delta=30$, $\lambda_0=1550$ nm, namely, 1.16, 0.77, and 0.39 ($\times 10^6$).

Figure 7:
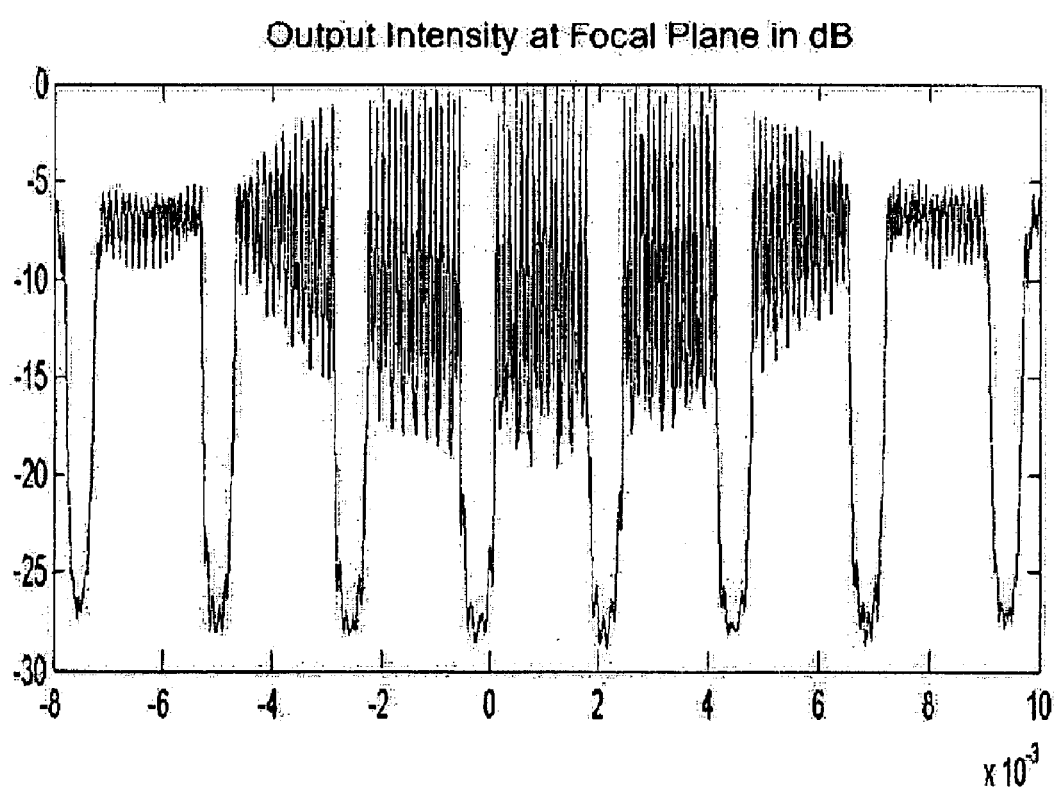
Figure 8:
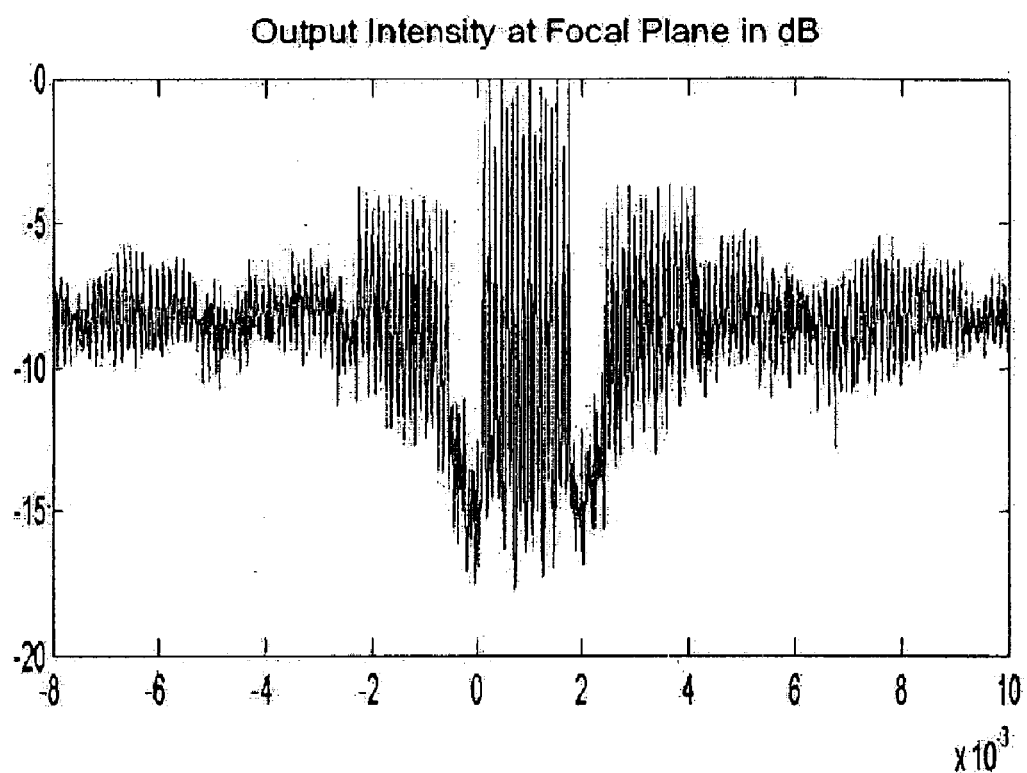

In MISZC, both sampling randomly and implementing zero-crossings are crucial to achieve good results. In the following, comparison results are given to discuss the importance of less than random sampling. FIGS. 7 and 8 show the results in cases where total random sampling is not used. All the parameters are the same as in FIG. 5, except that the parameter r is fixed as 0, ¼ and ½, respectively. It is observed that the harmonics of different orders start showing up when r is less than 1, i.e. with less than total randomness. In comparison, FIG. 5 shows the case with r=1, and no harmonics appear since total random sampling is used in this case.

2.1.1. Plane Wave Case

Figure 9:
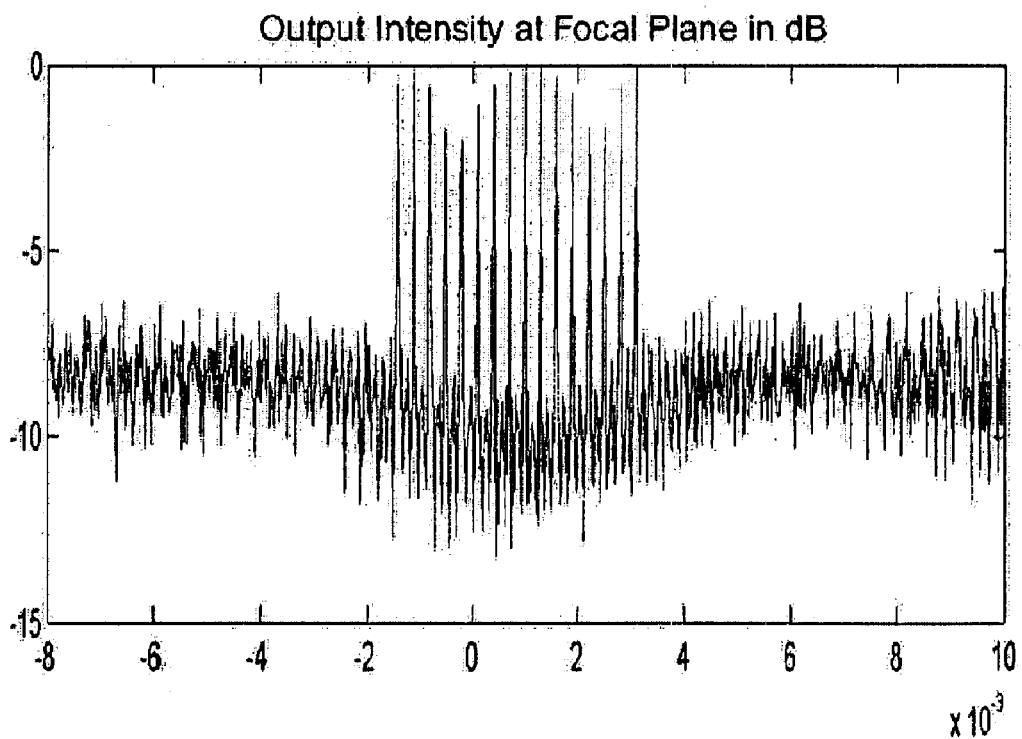
Figure 10A:
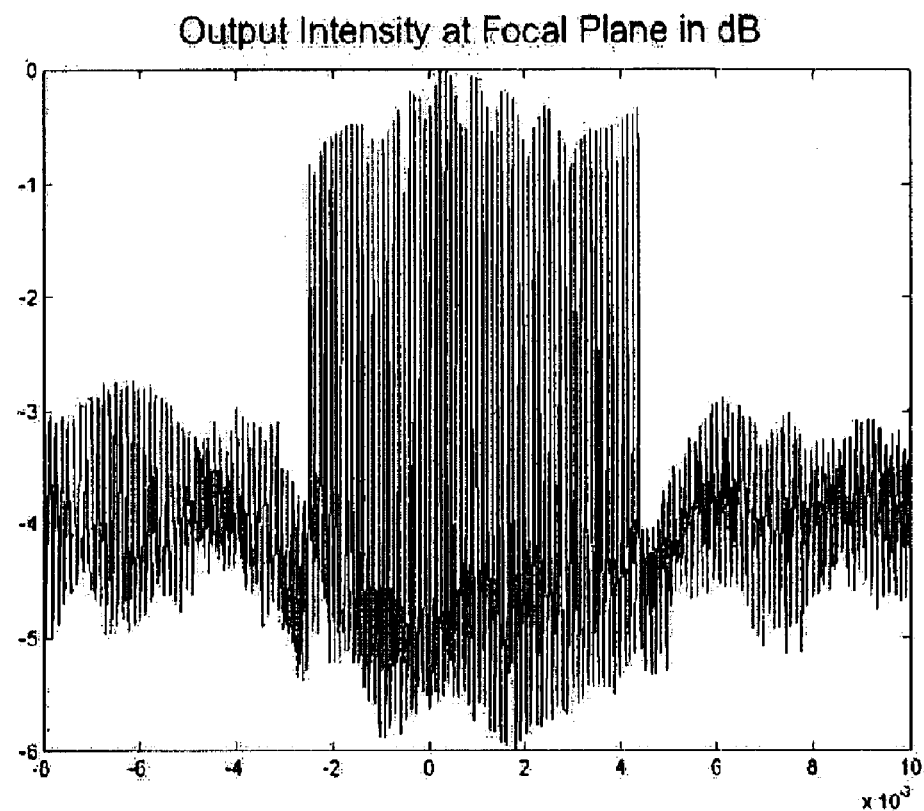
Figure 10B:
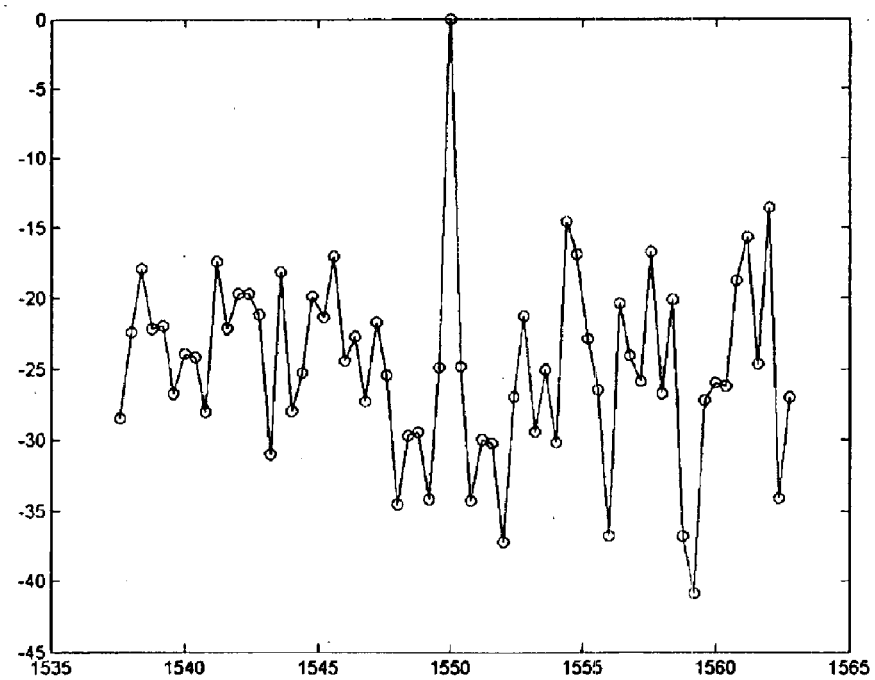
Figure 11A:
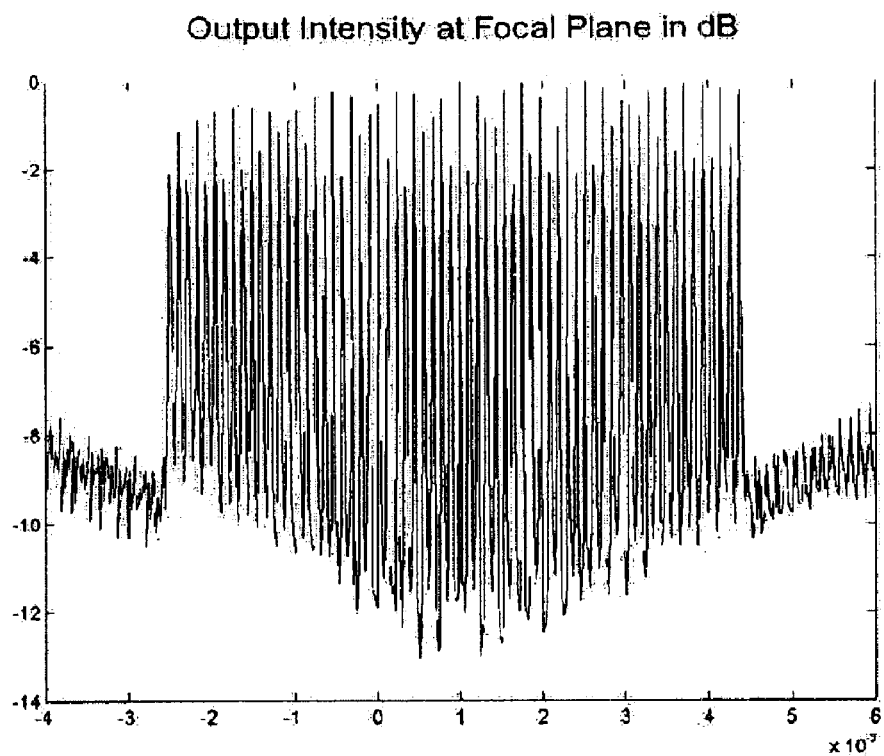
Figure 11B:
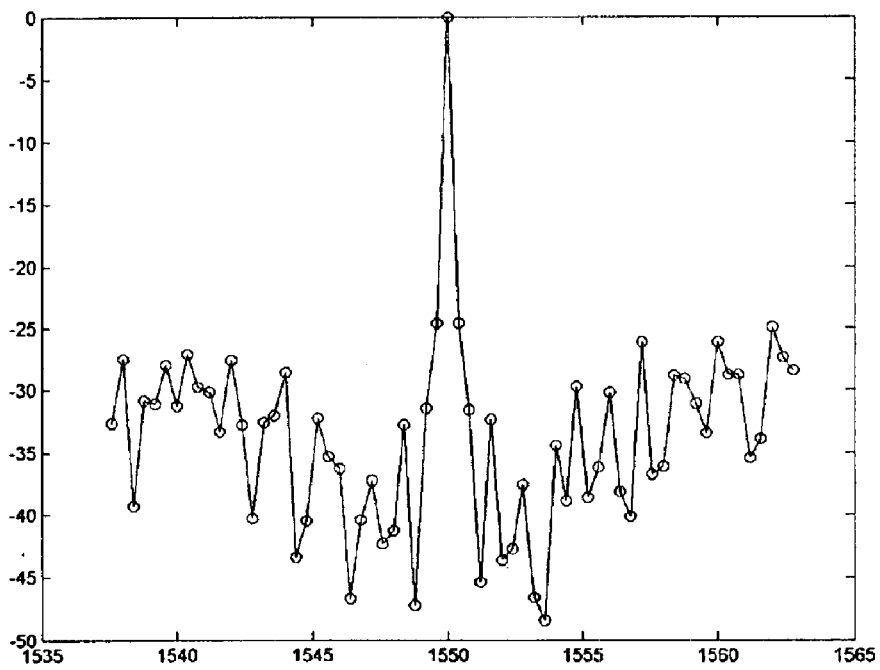
Figure 12A:
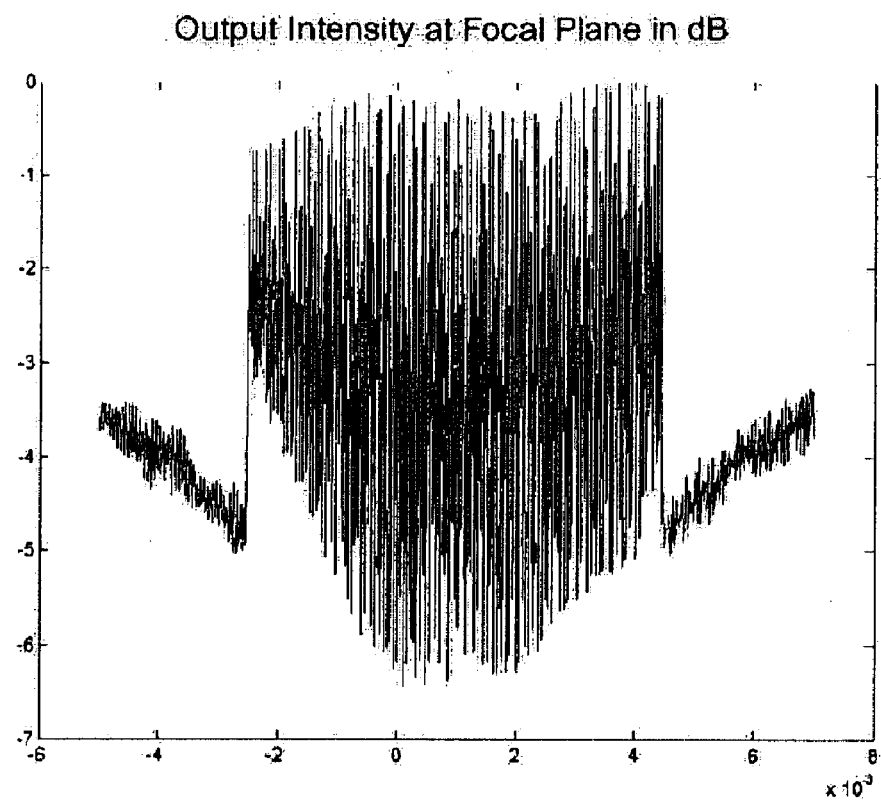
Figure 12B:
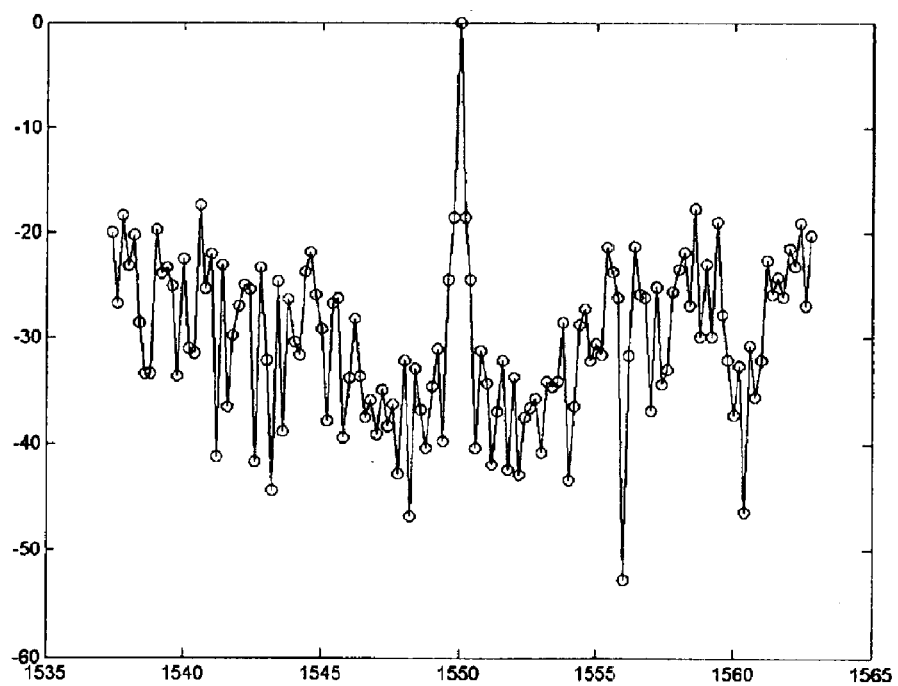
Figure 13A:
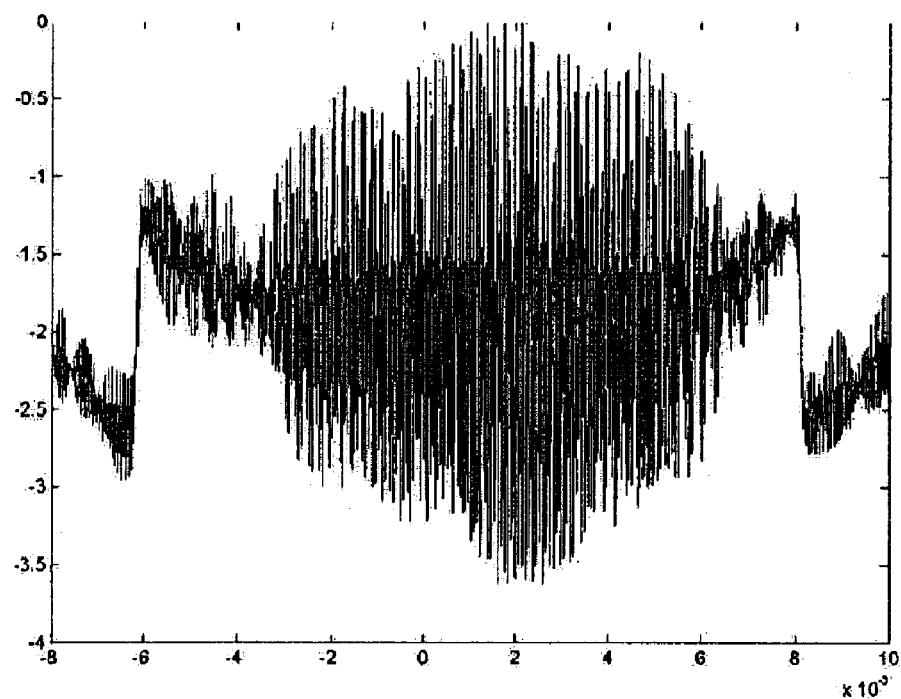
Figure 13B:
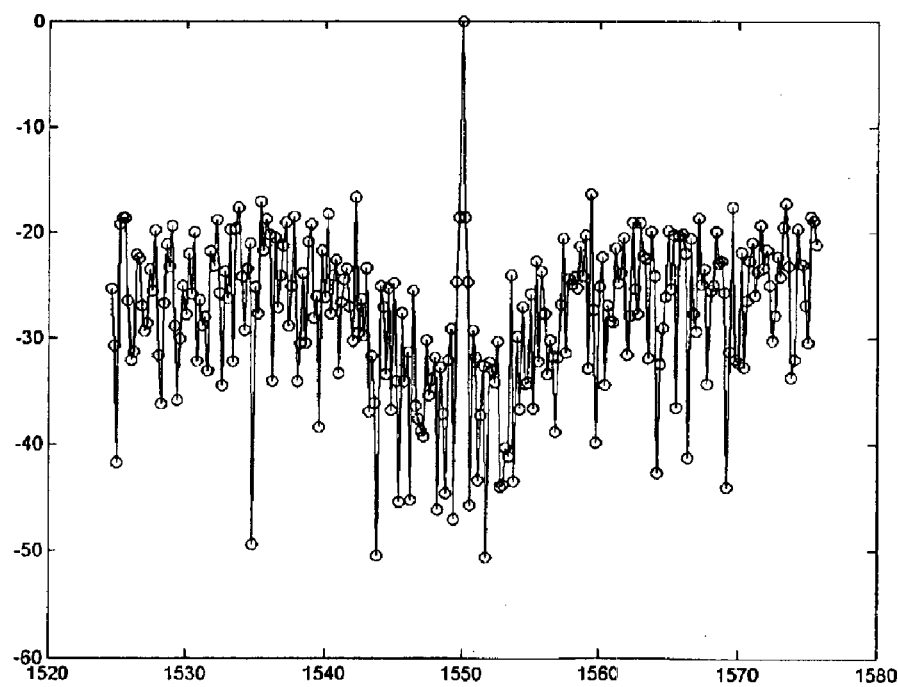

All the theoretical derivations and simulation results shown above include a spherical reference wave modulation since this is the general case. However, the plane reference wave is actually sufficient to achieve similar results. An example is shown in FIG. 9 with 16 channels.

2.1.2. Large Number of Channels

The major benefit of the removal of the harmonic images is the ability to increase the possible number of channels. We have designed a number of cases between 64 and 1024 channels. The examples with 64, 128, and 256 channels are described below. In the figures below, the number of phased arrayed, apertures, the number of channels and the wavelength separation are represented by M, L, and $\Delta X$, respectively. FIGS. 10 thru 13 show the results with different device parameters. Each figure actually consists of two figures. Every top figure shows the demultiplexing properties under simultaneous multi-channel operation. In these figures, we observe that the nonuniformity among all the channels are in the range of 2 dB. It is also usual in the literature on WDM devices to characterize the crosstalk performance by specifying the single channel crosstalk figure under the worst case. Every bottom figure is the normalized transmission spectrum with respect to the applied wavelengths in the central output port. The crosstalk values are estimated to be 15 dB, 25 dB, 20 dB, 18 dB. It is observed that crosstalk value improves when more apertures (waveguides in the case of phasars) are used.

2.2. Finite Sized Apertures

Figure 14:
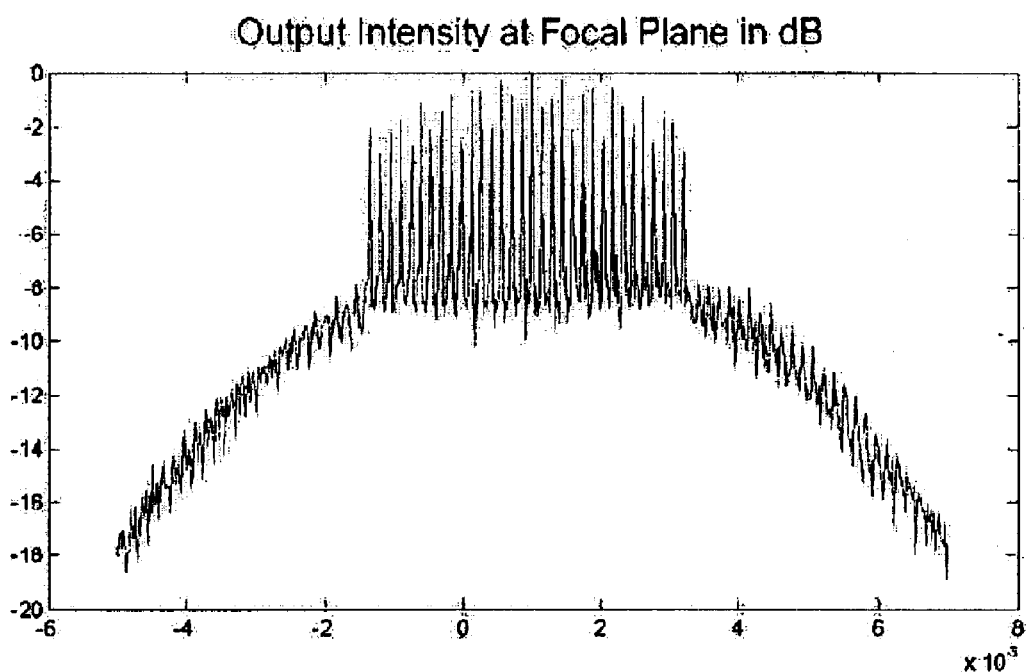
Figure 15:
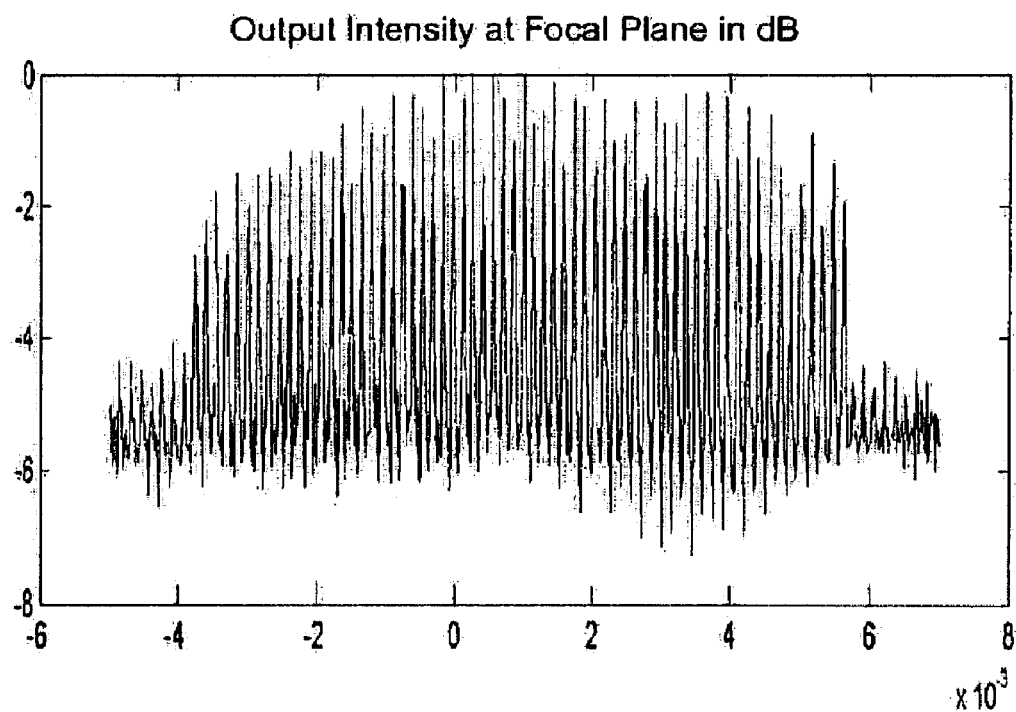
Figure 16:
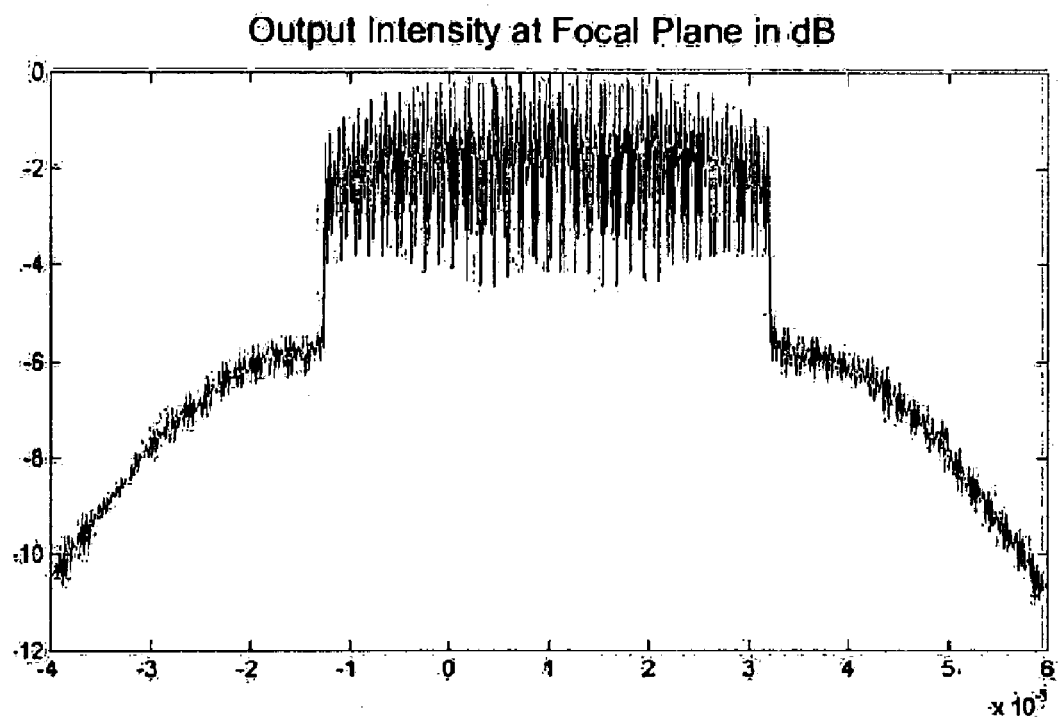

We discussed the theory for the case of finite sized apertures yielding beams with Gaussian profile in Section 1.4. Using Eq. (36), we ran a number of simulations. The results are shown in FIGS. 14 thru 16 for the number of channels equal to 32, 64, and 128, respectively. It is observed that the results are quite acceptable.

The method scales well with increasing number of channels. The noise level remains stable. An example with 1024 channels and finite sized apertures is shown in FIG. 17.

2.3. The Method of Creating the Negative of the Phase of the Total Phasefront

The experimental results up to this point is for the method of automatic zero-crossings. FIGS. 18 and 19 show two example designs with the method of creating the negative of the phase of the total phasefront with point-source and finite sized apertures, respectively, and both with 16 channels. It is observed that the results are equally valid as in the previous cases.

2.4. Error tolerances

The phase errors are expected to be produced during fabrication. The phase error tolerance has been investigated by applying random phase error to each array aperture. The random phase errors were approximated by uniform distribution in the range of [−ERR, ERR] where ERR is the specified maximum error $|ERR| \leq \pi$. As long as we satisfy $$|ERR| \leq \pi/2 \tag{37}$$

the phasors point in similar direction so that there is positive contribution from each aperture. Hence, satisfactory results are expected. This is confirmed by simulation experiments shown in FIGS. 20 thru 22, corresponding to ERR=0.02 $\pi$, 0.10 $\pi$, and 0.25 $\pi$, respectively.

2.5 3-D Simulations

Figure 23B:
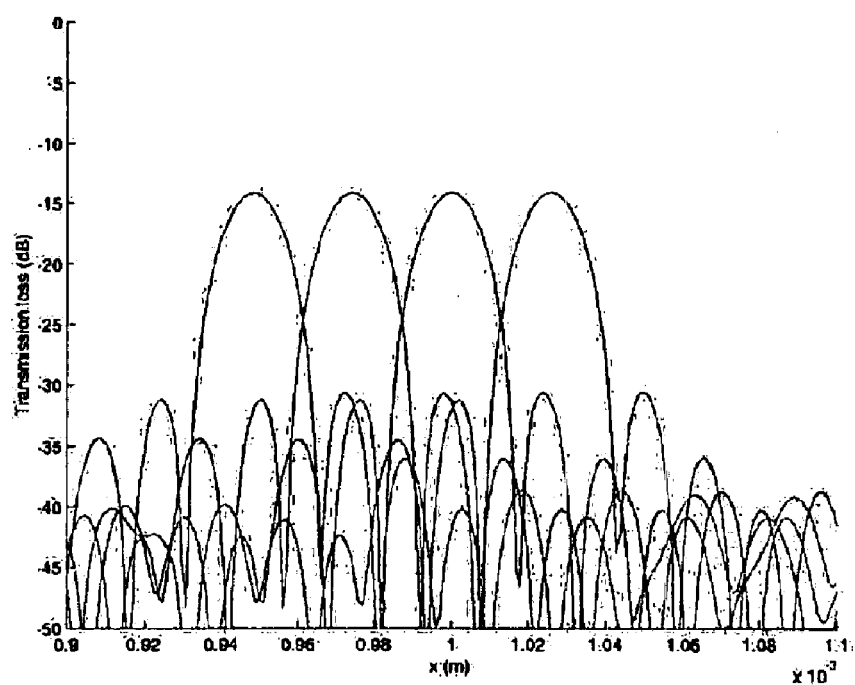

The 3-D method was investigated through simulations in a similar fashion. FIG. 23 shows one example of focusing and demultiplexing on the image plane (x-y plane at z=z0). The 4 wavelengths used were 1549.2 nm, 1549.6 nm, 1550 nm, 1550.4 nm, spaced by 0.4 nm (50 GHz). The array was generated with 50*50 apertures on a 2 mm*2 mm square plane. The diffraction order in x-direction $\delta_x$ was set to 5, while that in y-direction $\delta_y$ was set to zero.

In FIG. 23, part (a) shows demultiplexing on the image plane (x-y plane of z=z0), and part (b) shows the corresponding insertion loss on the output line (x-direction) on the same plane.

It is observed that a reasonably small value of diffraction order (ox 5) is sufficient to generate satisfactory results. This is significant since it indicates that manufacturing in 3-D can indeed be achievable with current technology. A major advantage in 3-D is that the number of apertures can be much larger as compared to the situation in 2-D.

2.6. Phase Quantization

Figure 24B:
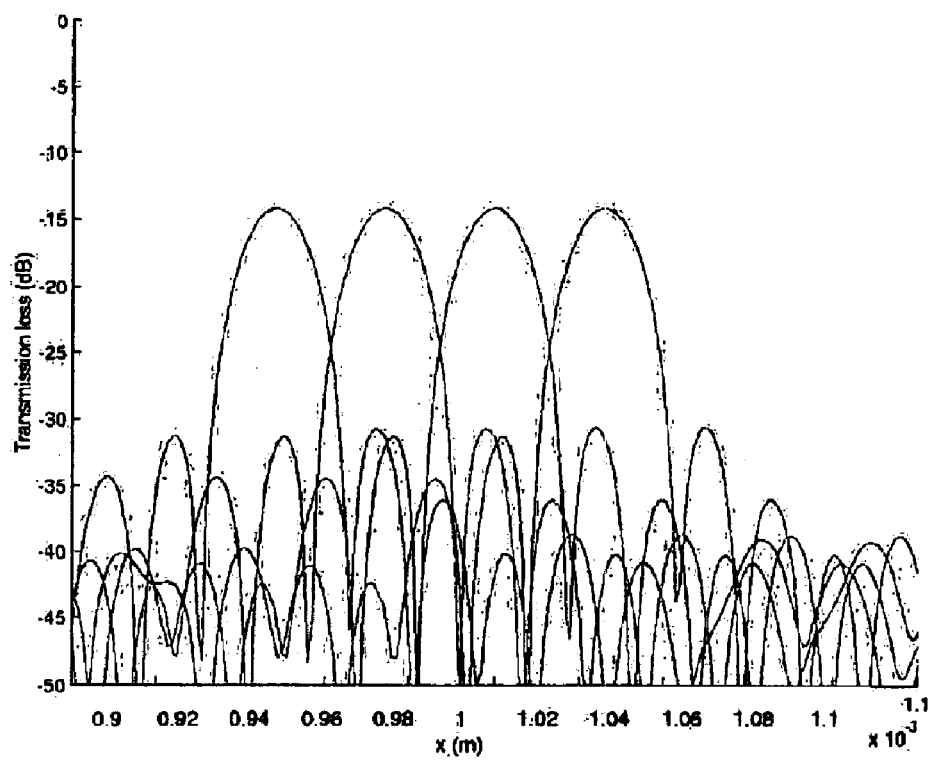
Figure 25B:
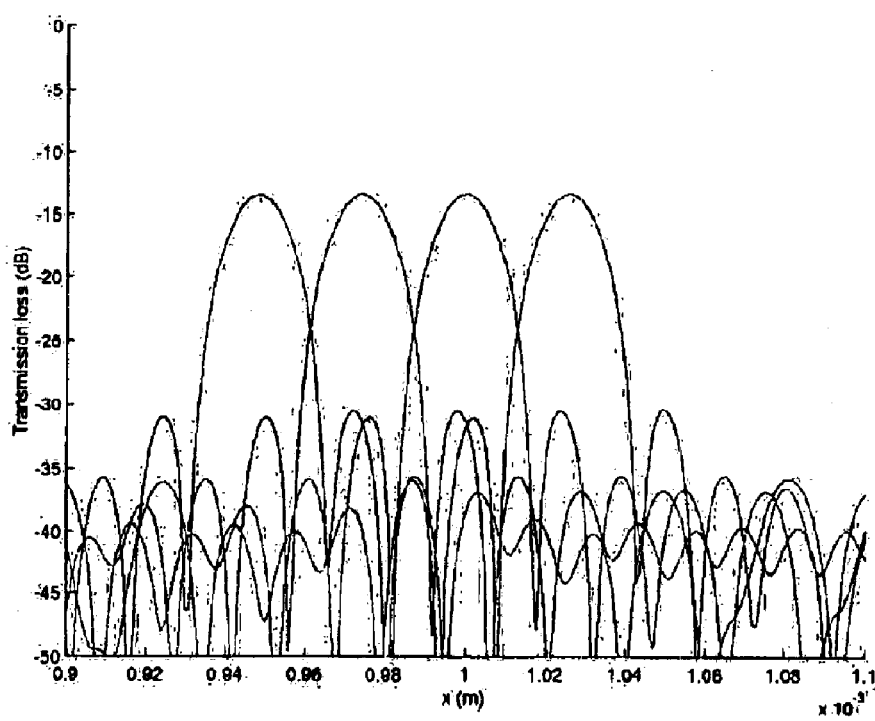

In actual fabrication, for example with technologies used in manufacturing diffractive optical devices, phase is often quantized. The technology used decides the number of quantization levels. FIGS. 24 and 25 show the demultiplexing results with 4 and 8 quantization levels, respectively. The results are certainly satisfactory.

3. Comparison and Extension of the Methods in Terms of Implementation

It is interesting to compare different approaches in terms of implementational issues. In all cases, we choose a central wavelength $\lambda$ of interest, and $k_w{}^l, k^l$ are with respect to $\lambda$. In phasar type of devices with waveguides on a plane, the lengths of the waveguides should be chosen according to the following equations:

(a) Plane Reference Wave Only, Automatic Zero Crossings $$L_i = \delta x_i \tag{38}$$

(b) Plane Reference Wave Only, Negative Phase Implementation $$L_i = \delta x_i - \theta_i/k_w^l \quad (39)$$

where $\theta_i$ is the phase given by $$\theta_i = [k_w^l \delta x_i \alpha k^l r_{oi}] \mod 2\pi \quad (40)$$

(c) Plane and Spherical Reference Waves, Automatic Zero-Crossings $$L_i = \delta x_i + \beta r_{ci} \quad (41)$$

(d) Plane and Spherical Reference Waves, Negative Phase Implementation $$L_i = \delta x_i + \beta r_{ci} - \theta_i/k_w^l \quad (42)$$

where $\theta_i$ is the phase given by $$\theta_i = [k_w^l \delta x_i + k_w^l \beta r_{ci} + k^l r_{oi}] \mod 2\pi \quad (43)$$

The equations above show that the method of physical generation of the negative of the phase appears to be more difficult to implement than the method of automatic zero-crossings in terms of waveguide length control. However, in the method of automatic zero-crossings, the positions of the apertures also have to be carefully adjusted. Since the initial positions of apertures are randomly chosen, this is not expected to generate additional difficulties since the result is another random number after adjustment. The simplest case appears to be case (a).

In devices especially in 3-D in which the phase $k_w^l \delta x_i + k_w^l \beta r_{ci}$ is implemented externally to the phase modulators, the modulators simply generate a constant phase such as zero in the method of automatic zero-crossings. In the method of negative phase implementation, the phase to be generated by each phase modulator is given by $$\theta_i = 2\pi - [k_w^l \delta x_i + k_w^l \beta r_{ci} + k^l r_{oi}] \mod 2\pi \quad (44)$$

3.1. Rowland and Confocal Geometries

In 2-D integrated optical implementations of phased array devices, often the Rowland geometry, and sometimes the confocal geometry are utilized. The method of the present invention is applicable to these geometries as well as any other possible geometry. For example, in both Rowland and confocal geometries, circular surfaces are used as shown in FIG. 26. For the central wavelength, say $\lambda$, the distance from the initial position of the input wave to the border of the slab housing the waveguides and the distance from the positions of the output locations of the waveguides to the position of the output channel can be chosen constant equal to R as shown in FIG. 26. In this case, the phase equation obtained from Eq. (10) can be written as $$k_w^l r_{ci} + k_w^l \delta' x_i + k^l R = 2\pi n + \phi_o \quad (45)$$

which is the same as $$r_{ci} + \delta x_i + R = n\lambda + \phi_o \lambda/2\pi \quad (46)$$

where $$\delta = \frac{k_w^1 \delta'}{k^1} \quad (47)$$

We have $$r_{oi} = \sqrt{(x_{o-x_i})^2 + z_c^2}$$

$$r_{ci} = \sqrt{(x_{c-x_i})^2 + z_c^2} \quad (48)$$

let $x_i$ be a guess, and $x_i' = x_i + \Delta$ be the corrected $x_i$ value. The goal is to determine $\Delta$. We can write $$r_{ci} + x_i \delta + R = r_{ci}' + x_i' + B + R \quad (49)$$

Let $$X_c = x_c - x_i$$

$$X_o = x_o - x_i \quad (50)$$

We write $$r_{oi}' = \sqrt{(x_{o-x_i'})^2 + z_c^2} = \sqrt{(x_{o-x_i-\Delta})^2 + z_c^2} = \sqrt{r_{oi}^2 - 2\Delta X_o + \Delta^2}$$

$$r_{ci}' = \sqrt{(x_{c-x_i'})^2 + z_c^2} = \sqrt{(x_{c-x_i-\Delta})^2 + z_c^2} = \sqrt{r_{ci}^2 - 2\Delta X_o + \Delta^2} \quad (51)$$

So we have $$r_{ci}' = r_{ci} + (x_i - x_i')\delta - B \quad (52)$$

$$r_{ci}'^2 = (r_{ci} - \delta\Delta - B)^2 \quad (53)$$

Choosing $$LHS = r_{ci}^2 - 2\Delta X_c \Delta^2 \quad (54)$$

$$RHS = r_{ci}^2 - 2r_{ci}(\Delta\delta + B) + (\Delta\delta + B)^2 \quad (55)$$

and letting LHS=RHS, we have $$C_2 \Delta^2 + C_1 \Delta + C_0 = 0 \quad (56)$$

where $$C_0 = 2r_{ci} B - B^2$$

$$C_1 = -2X_c + 2r_{ci}\delta - 2\delta B$$

$$C_2 = 1 - \delta^2 \quad (57)$$

Eq. (56) is next solved for $\Delta$.

Using this approach with Gaussian beams, we have tested both geometries (Case II) with the method. The results were better than the results discussed previously with the other geometry (Case I) in terms of flatness of the output result. An example is shown in FIG. 27.

3.2. Multifunctional WDM Design and Optimization

The DWDM device can be further developed with the aid of a diffractive optical element (DOE) as well as minimum mean squared error (MMSE) iterative optimization techniques in order to increase performance with respect to implementational issues such as quantized phase, and when a number of additional functions are desired. The most direct approach for this purpose is the following: in the regular AWG, the difference of lengths between two adjacent waveguides is $m\lambda$ (disregarding index of refraction) where m is the diffraction order. In MISZC, an additional length change which is a fraction of a wavelength is needed. This part can be considered to be the DOE since it has the exact same function. This part can also be generated as a quantized DOE to simplify implementation.

Additionally, the design of a DOE can be achieved to incorporate a number of functions. For example, a binary phase DOE can be used to simplify the 3-D layout of the arrayed waveguides. Additional functions can be generated such as the ability to choose output positions of the channels. This is important in a number of ways. For example, in DWDM optical systems, an optical component which removes specific channels and adds new ones anywhere in the optical link is very advantageous. Such a component, known as wavelength Add/Drop Multiplexers (WADM) or Optical Add/Drop switches (OADXs), can range in capacity from providing dedicated add/drop of a single wavelength to WDM channels. For this purpose, a dedicated single wavelength can be used in a number of channels, and provides dynamic, flexible reconfiguration as a form of add/drop traffic. This is shown in FIG. 28.

Figure 29A:
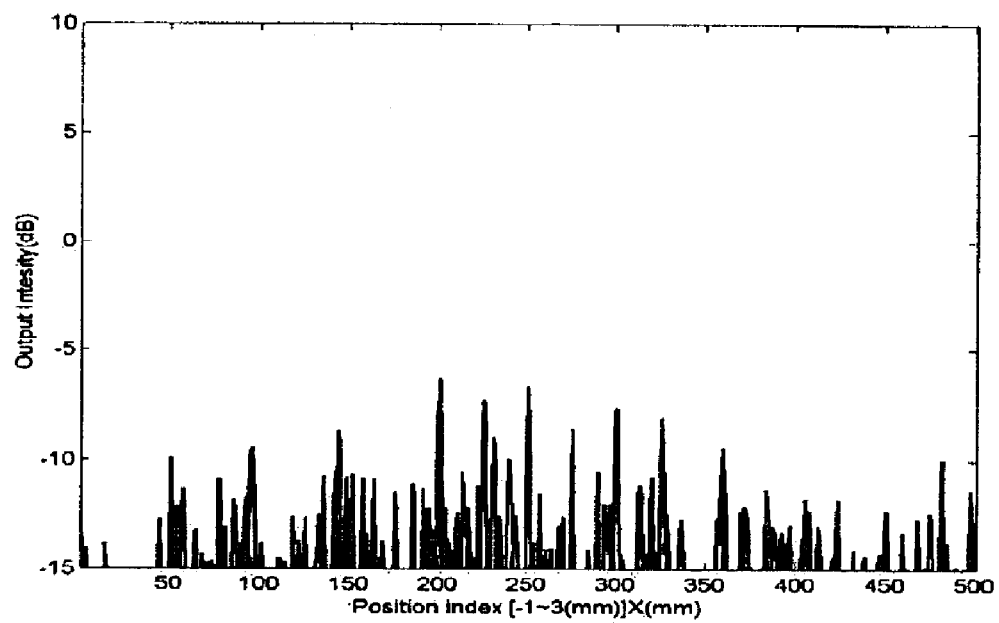
Figure 29B:
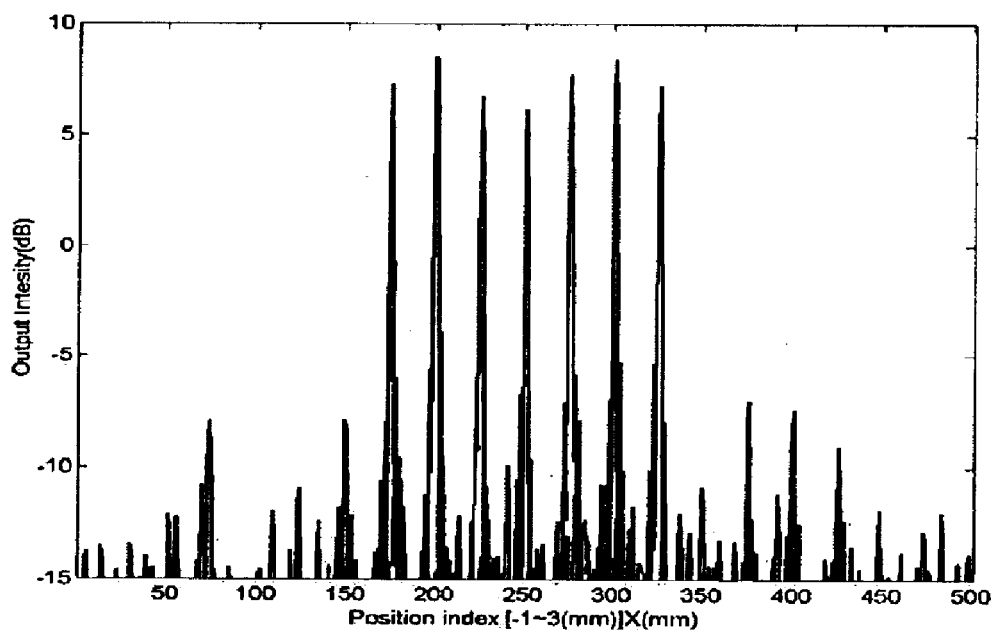

When designing such DOEs, the implementational issues usually dictate phase to be quantized. Then, best type of design is by using MMSE iterative optimization, which can also be used for correction of other possible types of error. A 2-D example is shown in FIG. 29. In this design, we have the ability to choose focusing points at arbitrary locations rather than relying on dispersion. Figure 29A shows the bad performance without MMSE optimization. FIG. 29B shows how the desired images are recovered after MMSE optimization. The same approach can be used to optimize against any other implementational imperfections.

3.3. 3-D Implementations

In 3-D, the disadvantage is that it may be more difficult to achieve large 8. The big advantage is that there are technologies for diffractive optical element design with many apertures, which can also be used for phased array devices for DWDM. In our simulations, it was observed that a of the order of 5 is sufficient to achieve sufficient resolution.

This can be achieved in a number of ways. One possible method is by using a setup as in FIG. 30, together with the method of virtual holography illustrated in FIG. 31 and described in O. K. Ersoy, "Virtual Holography: A Method of Source and Channel Encoding and Decoding of Information," Applied Optics, Vol. 18, No. 15, pp. 2543–2554, Aug. 1, 1979.

Figure 30B:
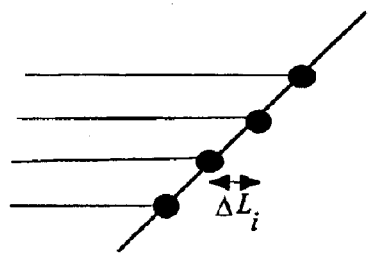

In order to achieve large δ, the array can be manufactured, say, five times larger than normal, and arranged tilted as shown in FIG. 30B so that $\Delta L_i$ shown in the figure is large. Then, the array (now called the real array) has the necessary phase modulation, and is imaged to the virtual array as shown in FIG. 31, following the method of virtual holography. If M is the demagnification used in the lateral direction, the demagnification in the z-direction is $M^2$. As a result, the tilt at the virtual array in the z-direction can be neglected. The virtual array has the necessary size and phase modulation in order to operate as desired to focus different wavelengths at different positions as discussed above.

Figure 33:
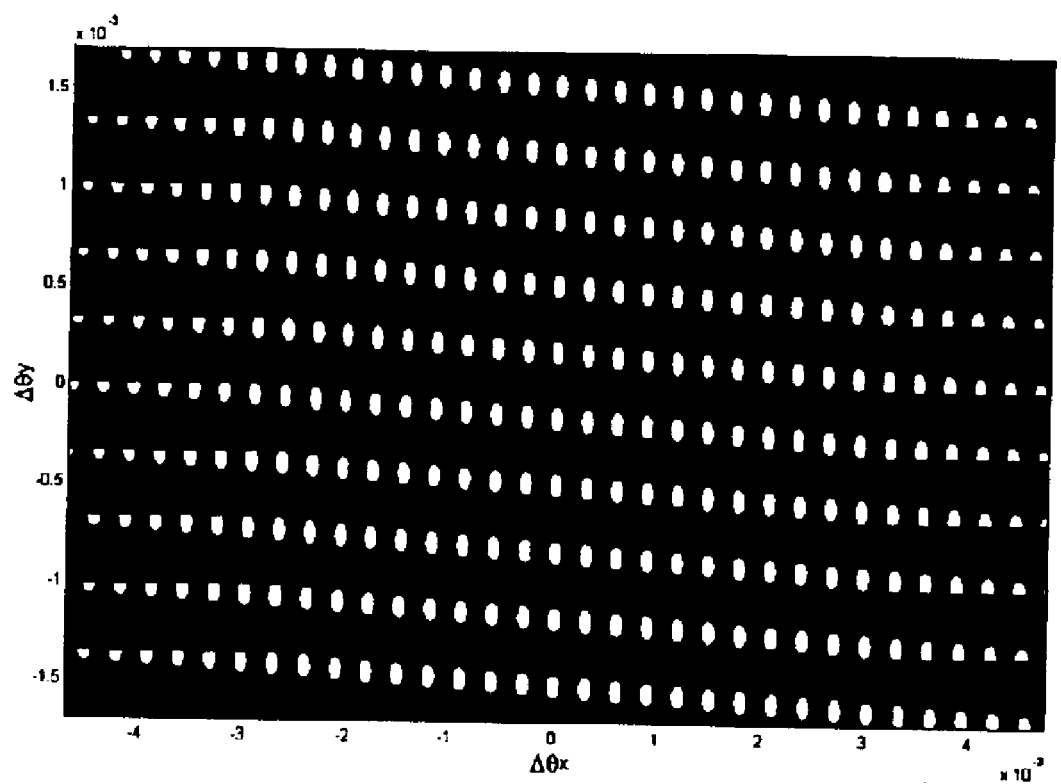

In Section 2.5, 3-D simulations were discussed. It is observed in FIGS. 23–25 that the output is on a single line. This is highly inefficient since it is desirable to have the output channels filling out the whole output plane in a 2-D array. Additional optics can be used to avoid this problem. For example, one alternative approach incorporates a prism, a cylindrical lens, and a number of AWG's interlaced on a 2-D plane, as shown in FIG. 32 as a block diagram. The output from such a device with 300 channels is shown in FIG. 33.

4. Conclusions

DWDM has become very significant for effective real-time transmission and processing of very large amounts of multimedia information. A major bottleneck in phased-array types of devices used in DWDM is the free spectral range (FSR) allowed. The present invention avoids this bottleneck and makes possible a very large number of channels to be processed with a single phased-array device. It also makes it more feasible to utilize 3-D technologies such as scanning microscopes and reactive ion etching used in diffractive optical device manufacturing, in addition to 2-D integrated optics technologies.

The method is based on irregular sampling of the zero-crossings of the total wavefront. The combination of irregular sampling and choosing zero-crossings in the presence of linear and/or spherical wave phase modulation essentially eliminates harmonic images which occur due to regular sampling and nonlinear encoding.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

The method can be further improved, for example, by iterative optimization techniques so that all the channels have more equal intensity during detection, and noise mechanisms such as crossover and insertion losses are minimized.

I claim:

1. A phased-array device for wavelength division multiplexing/demultiplexing, comprising:
   at least one input channel;
   a plurality of output channels:
   an irregularly sampled array of phase modulators between said input and output channels, said irregular array having a configuration and phase modulation such that effectively only one beam at a given wavelength is focused onto a given output channel.

2. The phased-array device of claim 1, wherein the individual phase modulators in said irregular array are randomly spaced, and wherein the relative locations of the individual phase modulators are determined by establishing a set of initially chosen locations, shifting each initial location by a random increment resulting in delay within one wavelength if the initially chosen locations are not sufficiently random, and then adjusting each shifted location a fraction of a wavelength such that the overall phase shift to a desired image point on one of said output channels equals a constant value.

3. The phased-array device of claim 1, wherein the individual phase modulators in said irregular array are randomly spaced, and each phase modulator generates a phase such that the overall phase shift to a desired image point on one of said output channels equals a constant value.

4. An arrayed-waveguide grating device for wavelength division multiplexing, comprising:
   at least one input waveguide having an input end and an output end;
   a first coupler connected to said output end of said input waveguide;
   an irregular array of waveguides connected on one end to said first coupler;
   a second coupler connected to a second end of said irregular array of waveguides; and
   an output device connected to said second coupler, said output device having a plurality of apertures,
   wherein said irregular array has a configuration such that effectively only one beam at a given wavelength is focused on one of said apertures of said output device.

5. The arrayed-waveguide grating device of claim 4, wherein said first and second couplers comprise slab waveguide regions.

6. The arrayed-waveguide grating device of claim 4, wherein the individual waveguides in said irregular array are unequally spaced, and wherein the relative locations of the output ends of said individual waveguides are determined by establishing a set of initially chosen locations, shifting each initial location by a random increment resulting in delay within one wavelength if the initial location is not sufficiently random, and then adjusting each shifted location a fraction of a wavelength such that the overall phase shift to a desired image point on one of said apertures equals a constant value.

7. The arrayed-waveguide grating device of claim 4, wherein the lengths of the individual waveguides in said irregular array are determined by establishing a set of varying initial lengths, adjusting each waveguide length by a random increment, and further adjusting the waveguide lengths such that the overall phase shift to a desired image point on one of said apertures equals a constant value.

8. The phased-array device of claim 1, wherein the phases generated by the phase modulators are determined according to the equation $$\theta_i = 2\pi - [k_w' \delta x_i + k_w' \beta r_{ci} + k' r_{oi}] \mod 2\pi.$$

9. The arrayed-waveguide grating device of claim 4, wherein the lengths of the individual waveguides in said irregular array are determined according to the equation $$L_i = \delta x_i + \beta r_{ci} - \theta_i / k_w'$$

where $$\theta_i = [k_w' \delta x_i + k_w' \beta r_{ci} + k' r_{oi}] \mod 2\pi.$$

10. A method of making a dense wavelength division multiplexing/demultiplexing device capable of effectively producing only one image at a given wavelength, comprising:

determining an initial spacing between elements for a plurality of phased array elements;

shifting the location of each of said phased array elements by a random increment resulting in delay within one wavelength if the initial location is not sufficiently random;

adjusting the shifted location of each of said phased array elements by a fraction of a wavelength such that the overall phase shift to a desired image point equals a constant value; and forming a phased array with elements spaced according to said adjusted shifted locations.

* * * * *

UNITED STATES PATENT AND TRADEMARK OFFICE
CERTIFICATE OF CORRECTION

PATENT NO. : 6,917,736 B1
APPLICATION NO. : 10/431957
DATED : July 12, 2005
INVENTOR(S) : Okan K. Ersoy Page 1 of 3

It is certified that error appears in the above-identified patent and that said Letters Patent is hereby corrected as shown below:

On the Title page, Item (56), in Other Publications, in the reference by H. Takahashi, S. Suzuki and I. Nishi, please change "vol. 2, 26., No." to --vol. 26, No. 2,--.

In column 2, line 39, please change "2 nm" to --2 $\pi$ m--.
In column 3, line 17, please change "2 $\pi$ as" to --2 $\pi$ as--.
In column 6, line 10, please add -- FIG. 33 shows the output plane in an alternative 3-D design with 300 channels.--
In column 7, line 6, please change "t" to --$\delta$--.
In column 7, line 17, please change "$r^{ci}$" to --$r_{ci}$--.
In column 7, line 25, please change "$r_o$" to -- $r_{oi}$--.
In column 7, please delete equation (12) and insert the following::

$$r_{oi} = \sqrt{(x_o - x_i)^2 + z_o^2} \qquad (12)$$
$$r_{ci} = \sqrt{(x_c - x_i)^2 + z_c^2}$$

In column 7, please delete equation (15) and insert the following:

$$r'_{oi} = \sqrt{(x_o - x'_i)^2 + z_o^2} = \sqrt{(x_o - x_i - \Delta)^2 + z_o^2} = \sqrt{r_{oi}^2 - 2\Delta X_c + \Delta^2} \qquad (15)$$

$$r'_{ci} = \sqrt{(x_c - x'_i)^2 + z_c^2} = \sqrt{(x_c - x_i - \Delta)^2 + z_c^2} = \sqrt{r_{ci}^2 - 2\Delta X_o + \Delta^2}$$

In column 7, please delete equation (16) and insert the following:

$$(r'_{ci} + r'_{oi})^2 = (r_{ci} + r_{oi} - \delta\Delta - B)^2 \qquad (16)$$

In column 8, please delete equation (17) and insert the following:

$$LHS = r_{ci}^2 - 2\Delta X_c + \Delta^2 + r_{oi}^2 - 2\Delta X_o + \Delta^2 + 2\sqrt{(r_{oi}^2 - 2\Delta X_o + \Delta^2)(r_{ci}^2 - 2\Delta X_c + \Delta^2)} \qquad (17)$$
$$= r_{ci}^2 + r_{oi}^2 - 2\Delta(X_c + X_o) + 2\Delta^2 + 2\sqrt{(r_{oi}^2 - 2\Delta X_o + \Delta^2)(r_{ci}^2 - 2\Delta X_c + \Delta^2)}$$

In column 8, please delete equation (18) and insert the following:

$$RHS = (r_{ci} + r_{oi} - B)^2 + (\delta\Delta)^2 - 2(r_{ci} + r_{oi} - B)\delta\Delta \qquad (18)$$
$$= r_{ci}^2 + r_{oi}^2 + 2r_{ci}r_{oi} + B^2 - 2B(r_{ci} + r_{oi}) + (\delta\Delta)^2 - 2(r_{ci} + r_{oi} - B)\delta\Delta$$

In column 8, please delete equation (19) and insert the following:

$$2\sqrt{(r_{oi}^2 - 2\Delta X_o + \Delta^2)(r_{ci}^2 - 2\Delta X_c + \Delta^2)} \qquad (19)$$
$$= 2r_{ci}r_{oi} + B^2 - 2B(r_{ci} + r_{oi}) + (\delta\Delta)^2 - 2(r_{ci} + r_{oi} - B)\delta\Delta$$

UNITED STATES PATENT AND TRADEMARK OFFICE
CERTIFICATE OF CORRECTION

PATENT NO. : 6,917,736 B1
APPLICATION NO. : 10/431957
DATED : July 12, 2005
INVENTOR(S) : Okan K. Ersoy It is certified that error appears in the above-identified patent and that said Letters Patent is hereby corrected as shown below:

In column 8, please delete lines 38-39 and insert the following:

-- $$RHS = [\Delta^2 G_1 + \Delta G_2 + G_3]^2$$
$$= \Delta^4 G_1^2 + \Delta^3(2G_1 G_2) + \Delta^2(G_2^2 + 2G_1 G_3) + \Delta(2G_2 G_3) + G_3^2$$ --

In column 8, delete equation (21) and insert the following:

-- $$\Delta^4 C_4 + \Delta^3 C_3 + \Delta^2 C_2 + \Delta C_1 + C_0 = 0 \quad (21)$$ --

In column 9, line 45, please change "they" to --the y--.
In column 11, line 8, please change "$x_o$ and $z_o$" to -- $x_o$' and $z_o$' --.
In column 11, please delete equation (33) and insert the following:

-- $$\Delta z = z_o' - z_o = z_o(\frac{\lambda}{\lambda'} - 1) = z_o \frac{-\Delta\lambda}{\lambda'}, \quad \left|\frac{\Delta z}{\Delta\lambda}\right| \approx \frac{z_0}{\lambda}$$

$$\Delta x \approx -z_0(1-R)(\delta - \frac{x_c}{z_c}), \quad \left|\frac{\Delta x}{\Delta\lambda}\right| \approx \frac{z_0}{\lambda}\left|\delta - \frac{x_c}{z_c}\right| \quad (33)$$ --

In column 12, line 60, please change "$\Delta X$" to --$\Delta\lambda$--.
In column 13, line 46, please change "$\Delta X$" to --$\Delta\lambda$--.
In column 13, line 52, please change "2 dB" to --~2dB--.
In column 14, line 43, please change "(ox 5)" to --($\delta_x \sim 5$)--.
In column 15, please delete equation (40) and insert the following:

-- $$\theta_i = \left[k_w^1 \delta x_i + k^1 r_{oi}\right] \mod 2\pi \quad (40)$$ --

In column 15, please delete equation (48) and insert the following:

-- $$r_{oi} = \sqrt{(x_o - x_i)^2 + z_o^2} \quad (48)$$
$$r_{ci} = \sqrt{(x_c - x_i)^2 + z_c^2}$$ --

In column 16, please delete equation (51) and insert the following:

-- $$r_{oi}' = \sqrt{(x_o - x_i')^2 + z_o^2} = \sqrt{(x_o - x_i - \Delta)^2 + z_o^2} = \sqrt{r_{oi}^2 - 2\Delta X_o + \Delta^2} \quad (51)$$
$$r_{ci}' = \sqrt{(x_c - x_i')^2 + z_c^2} = \sqrt{(x_c - x_i - \Delta)^2 + z_c^2} = \sqrt{r_{ci}^2 - 2\Delta X_o + \Delta^2}$$ --

In column 16, please delete the equation (54) and insert the following:

-- $$LHS = r_{ci}^2 - 2\Delta X_c + \Delta^2 \quad (54)$$ --

UNITED STATES PATENT AND TRADEMARK OFFICE
CERTIFICATE OF CORRECTION

PATENT NO. : 6,917,736 B1
APPLICATION NO. : 10/431957
DATED : July 12, 2005
INVENTOR(S) : Okan K. Ersoy It is certified that error appears in the above-identified patent and that said Letters Patent is hereby corrected as shown below:

In column 17, line 20, please change "8" to -- $\delta$ --.
In column 17, line 23, please change "a" to -- $\delta$ --.

Signed and Sealed this

Thirty-first Day of July, 2007

JON W. DUDAS
*Director of the United States Patent and Trademark Office*